(12) United States Patent
Nose et al.

(10) Patent No.: US 9,779,514 B2
(45) Date of Patent: *Oct. 3, 2017

(54) DISPLAY DEVICE, DISPLAY PANEL DRIVER AND DRIVING METHOD OF DISPLAY PANEL

(71) Applicant: Synaptics Japan GK, Tokyo (JP)

(72) Inventors: Takashi Nose, Tokyo (JP); Hirobumi Furihata, Tokyo (JP); Akio Sugiyama, Tokyo (JP)

(73) Assignee: Synaptics Japan GK, Tokyo (JP)

( * ) Notice: Subject to any disclaimer, the term of this patent is extended or adjusted under 35 U.S.C. 154(b) by 192 days.

This patent is subject to a terminal disclaimer.

(21) Appl. No.: 14/598,035

(22) Filed: Jan. 15, 2015

(65) Prior Publication Data

US 2015/0206331 A1    Jul. 23, 2015

(30) Foreign Application Priority Data

Jan. 17, 2014  (JP) .................. 2014-007156

(51) Int. Cl.
  *G06T 11/60*    (2006.01)
  *G06T 5/40*     (2006.01)
  *G06T 5/00*     (2006.01)
  *G06T 7/40*     (2017.01)
  *G06T 7/90*     (2017.01)

(52) U.S. Cl.
  CPC .............. *G06T 7/408* (2013.01); *G06T 5/009* (2013.01); *G06T 5/40* (2013.01); *G06T 7/90* (2017.01)

(58) Field of Classification Search
  None
  See application file for complete search history.

(56) References Cited

U.S. PATENT DOCUMENTS

| 7,973,973 B2 | 7/2011 | Nose et al. | |
|---|---|---|---|
| 2007/0268524 A1* | 11/2007 | Nose ................... | G09G 3/2007 358/3.01 |
| 2012/0093419 A1* | 4/2012 | Liba ....................... | G06T 7/403 382/197 |

(Continued)

FOREIGN PATENT DOCUMENTS

JP        2004-023522 A    1/2004

*Primary Examiner* — Mark Zimmerman
*Assistant Examiner* — Yu-Jang Tswei
(74) *Attorney, Agent, or Firm* — Patterson + Sheridan, LLP

(57) ABSTRACT

A display device includes a display panel including a display region and a driver driving each pixel of the display region in response to input image data. The driver calculates area characterization data indicating feature quantities of an image displayed in each of areas defined in the display region for each of the areas, based on the input image data and generates pixel-specific characterization data associated with each pixel by applying filtering to the area characterization data associated with the area in which each pixel is located and with areas adjacent to the area in which each pixel is located. The driver generates output image data associated with each pixel by performing a correction on the input image data associated with each pixel in response to the pixel-specific characterization data associated with each pixel and drives each pixel in response to the output image data associated with each pixel.

16 Claims, 15 Drawing Sheets

(56) References Cited

U.S. PATENT DOCUMENTS

| | | | | |
|---|---|---|---|---|
| 2012/0127297 A1* | 5/2012 | Baxi | .................... | G06T 7/0002 348/79 |
| 2012/0212488 A1* | 8/2012 | Yu | .......................... | G06T 15/40 345/422 |
| 2014/0086507 A1* | 3/2014 | Lin | ......................... | G06T 5/00 382/274 |

* cited by examiner

DISPLAY DEVICE, DISPLAY PANEL DRIVER AND DRIVING METHOD OF DISPLAY PANEL

CROSS REFERENCE

This application claims priority of Japanese Patent Application No. 2014-007156, filed on Jan. 17, 2014, the disclosure which is incorporated herein by reference.

TECHNICAL FIELD

The present relates to a panel display device, a display panel driver and a method of driving a display panel, more particularly, to a panel display device, a display panel driver and a method of driving a display panel adapted to a correction calculation on image data.

BACKGROUND ART

The auto contrast optimization is one of the widely used techniques for improving display qualities of panel display devices such as liquid crystal display devices. For example, contrast enhancement of a dark image under a situation that the brightness of a backlight is desired to be reduced effectively suppresses deterioration of the image quality with a reduced power consumption of the liquid crystal display device. In one approach, the contrast enhancement may be achieved by performing a correction calculation on image data (which indicate grayscale levels of each subpixel of each pixel). Japanese Patent Gazette No. 4,198,720 B discloses a technique for achieving a contrast enhancement, for example.

In general, currently-used auto contrast enhancement is achieved by analyzing image data of the entire image and performing a common correction calculation for all the pixels on the basis of the analysis; however, such auto contrast enhancement may cause a problem that, when a strong contrast enhancement is performed, the number of representable grayscale levels is reduced in dark and/or bright regions of images. A strong contrast enhancement potentially causes so-called "blocked up shadows" (that is, a phenomenon in which an image element originally to be displayed with a grayscale representation is undesirably displayed as a black region with a substantially-constant grayscale level) in a dark region in an image, and also potentially causes so-called "clipped white" in a bright region in an image.

Japanese Patent Application Publication No. 2004-23522 A discloses a contrast correction circuit which can reproduce an image with a high contrast regardless of the contents of the image. The disclosed contrast correction circuit is configured to calculate luminance frequency distribution information for each of a plurality of areas defined by dividing the display screen and to control the input-output characteristics of a grayscale level correction section on the basis of the frequency distribution information.

The contrast correction circuit disclosed in Japanese Patent Application Publication No. 2004-23522 A, however, suffers from a problem of block noise, because the contrast correction is individually performed for each area.

SUMMARY OF INVENTION

Therefore, an objective of the present invention is to achieve a desired auto contrast enhancement. Other objectives and new features of the present invention would be understood from the disclosure in the Specification and attached drawings.

In an aspect of the present invention, a display device includes a display panel including a display region and a driver driving each pixel of the display region in response to input image data. A plurality of areas are defined in the display region. The driver calculates area characterization data indicating at least one feature value of an image displayed in each of the areas defined in the display region for each of the areas, based on the input image data. The driver additionally generates pixel-specific characterization data associated with each pixel by applying filtering to the area characterization data associated with the area in which each pixel is located and with areas adjacent to the area in which each pixel is located. The driver further generates output image data associated with each pixel by performing a correction on the input image data associated with each pixel in response to the pixel-specific characterization data associated with each pixel, and drives each pixel in response to the output image data associated with each pixel.

In another aspect of the present invention, a display driver is provided which drives each pixel in a display region of a display panel in response to input image data. The display panel driver includes: an area characterization data calculation section calculating area characterization data indicating at least one feature value of an image displayed in each of areas defined in the display region for each of the areas, based on the input image data; a pixel-specific characterization data calculation section generating pixel-specific characterization data associated with each pixel by applying filtering to the area characterization data associated with the area in which each pixel is located and with areas adjacent to the area in which each pixel is located; a correction circuitry generating output image data associated with each pixel by performing a correction on the input image data associated with each pixel in response to the pixel-specific characterization data associated with each pixel; and a drive circuitry driving each pixel in response to the output image data associated with each pixel.

In still another aspect of the present invention, a driving method of a display panel including a display region is provided. The driving method includes: calculating area characterization data indicating at least one feature value of an image displayed in each of a plurality of areas defined in the display region for each of the areas, based on the input image data; generating pixel-specific characterization data associated with each pixel of the display region by applying filtering to the area characterization data associated with the area in which each pixel is located and with areas adjacent to the area in which each pixel is located; generating output image data associated with each pixel by performing a correction on the input image data associated with each pixel in response to the pixel-specific characterization data associated with each pixel; and driving each pixel in response to the output image data associated with each pixel.

The present invention provides improved auto contrast enhancement.

BRIEF DESCRIPTION OF THE DRAWINGS

The above and other advantages and features of the present invention will be more apparent from the following description taken in conjunction with the accompanied drawings, in which.

DESCRIPTION OF PREFERRED EMBODIMENTS

The invention will be now described herein with reference to illustrative embodiments. Those skilled in the art would recognize that many alternative embodiments can be accomplished using the teachings of the present invention and that the invention is not limited to the embodiments illustrated for explanatory purposed.

Figure 1:
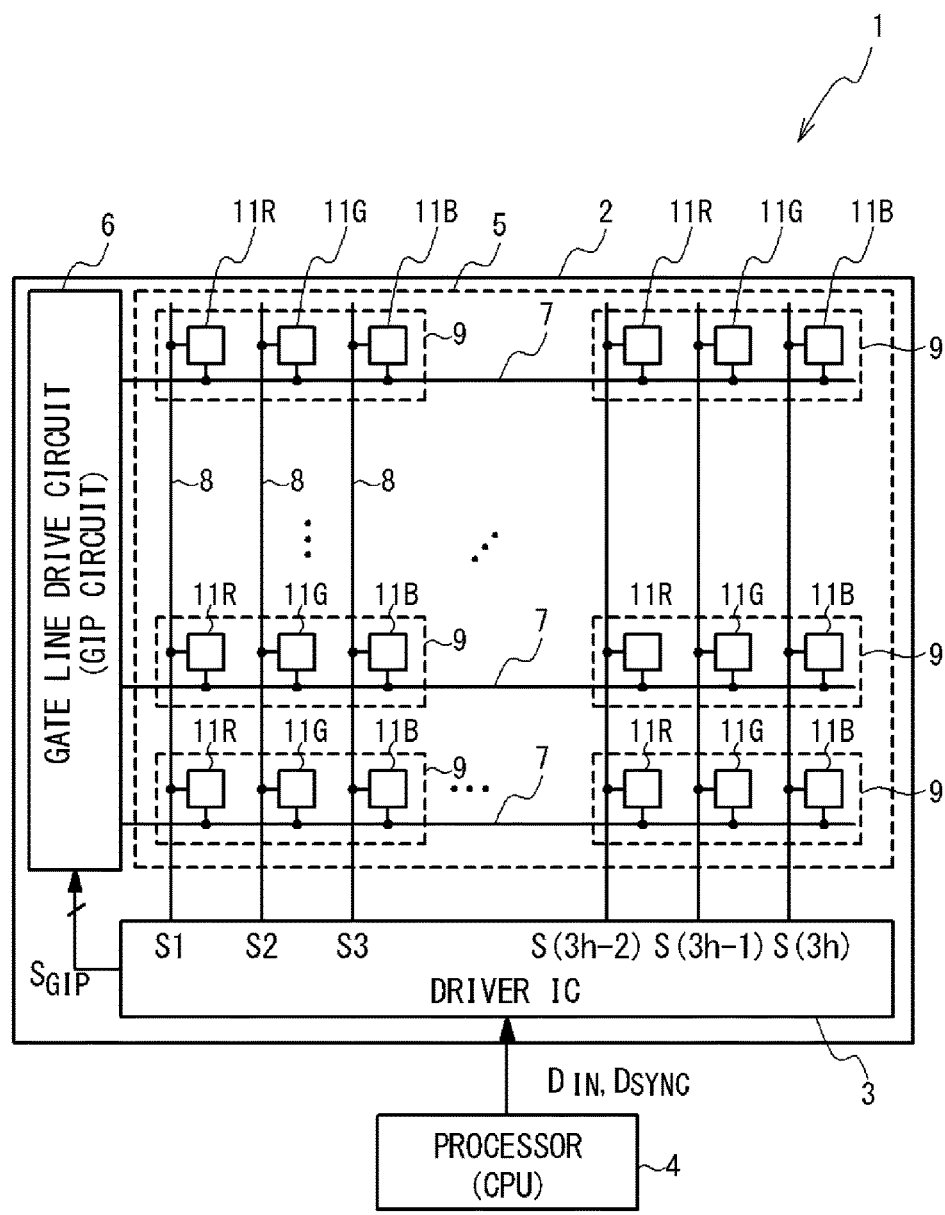
FIG. 1 is a block diagram illustrating an exemplary configuration of a panel display device in one embodiment of the present invention.

FIG. 1 is a block diagram illustrating an exemplary configuration of a panel display device in one embodiment of the present invention. The panel display device of the present embodiment, which is configured as a liquid crystal display device, denoted by numeral 1, includes an LCD (liquid crystal display) panel 2 and a driver IC (integrated circuit) 3.

The LCD panel 2 includes a display region 5 and a gate line drive circuit 6 (also referred to as GIP (gate in panel) circuit). Disposed in the display region 5 are a plurality of gate lines 7 (also referred to as scan lines or address lines), a plurality of data lines 8 (also referred to as signal lines or source lines) and pixels 9. In the present embodiment, the number of the gate lines 7 is v and the number of the data lines 8 is 3h; the pixels 9 are arranged in v rows and h columns in the display region 5, where v and h are integers equal to or more than two.

In the present embodiment, each pixel 9 includes three subpixels: an R subpixel 11R, a G subpixel 11G and a B subpixel 11B, where the R subpixel 11R is a subpixel corresponding to a red color (that is, a subpixel which displays the red color), the G subpixel 11G is a subpixel corresponding to a green color (that is, a subpixel which displays the green color) and the B subpixel 11B is a subpixel corresponding to a blue color (that is, a subpixel which displays the blue color). It should be noted that the R subpixels 11R, G subpixels 11G and B subpixels 11B may be collectively referred to as subpixels 11 if not distinguished from each other. In the present embodiment, subpixels 11 are arranged in v rows and 3h columns on the LCD panel 2. Each subpixel 11 is connected with a corresponding gate line 7 and a corresponding data line 8. In driving respective subpixels 11 on the LCD panel 2, the gate lines 7 are sequentially selected and desired drive voltages are written into subpixels 11 connected with the selected gate line 7 via the data lines 8. This effectively allows setting the respective subpixels 11 to desired grayscale levels to thereby display a desired image in the display region 5 of the LCD panel 2.

Figure 2:
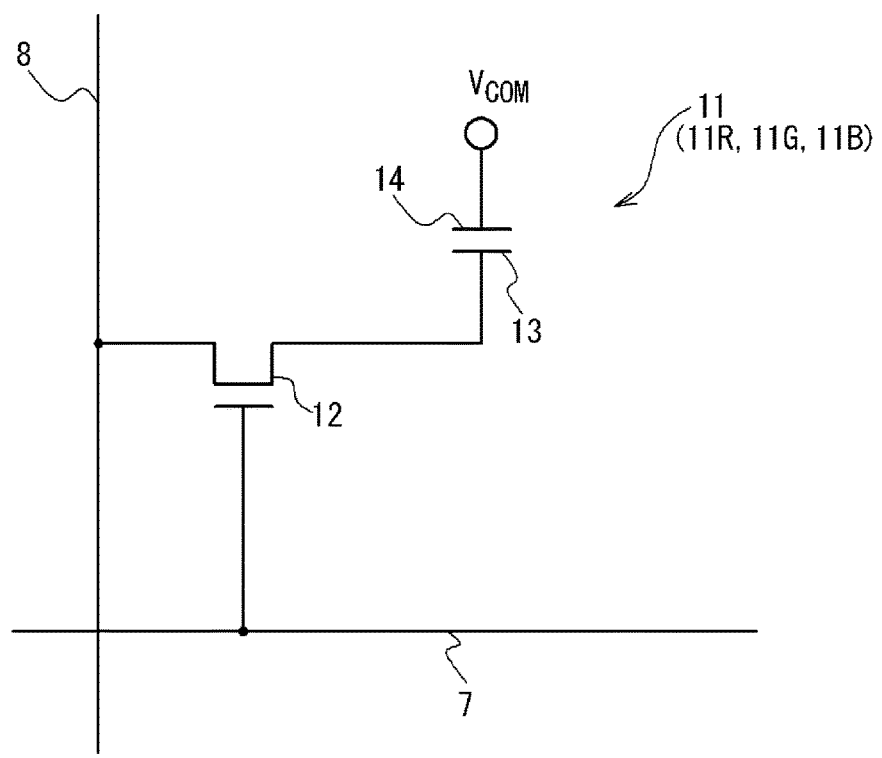
FIG. 2 is a circuit diagram schematically illustrating the configuration of each subpixel.

FIG. 2 is a circuit diagram schematically illustrating the configuration of each subpixel 11. Each subpixel 11 includes a TFT (thin film transistor) 12 and a pixel electrode 13. The TFT 11 has a gate connected with a gate line 7, a source connected with a data line 8 and a drain connected with the pixel electrode 13. The pixel electrode 13 is opposed to the opposing electrode (common electrode) 14 of the LCD panel 2 and the space between each pixel electrode 13 and the opposing electrode 14 is filled with liquid crystal. Although FIG. 2 illustrates the subpixel 11 as if the opposing electrode 14 may be separately disposed for each subpixel 11, a person skilled in the art would appreciate that the opposing electrode 14 is actually shared by the subpixels 11 of the entire LCD panel 2.

Referring back to FIG. 1, the driver IC 3 drives the data lines 8 and also generates gate line control signals $S_{GIP}$ for controlling the gate line drive circuit 6. The drive of the data lines 8 is responsive to input image data $D_{IN}$ and synchronization data $D_{SYNC}$ received from a processor 4 (for example, a CPU (central processing unit)). It should be noted here that the input image data $D_{IN}$ are image data corresponding to images to be displayed in the display region 5 of the LCD panel 2, more specifically, data indicating the grayscale levels of each subpixel 11 of each pixel 9. In the present embodiment, the input image data $D_{IN}$ represent the grayscale level of each subpixel 11 of each pixel 9 with eight bits. In other words, the input image data $D_{IN}$ represent the grayscale levels of each pixel 9 of the LCD panel 2 with 24 bits. In the following, data indicating the grayscale level of an R subpixel 11R of input image data $D_{IN}$ may be referred to as input image data $D_{IN}^R$. Correspondingly, data indicating the grayscale level of a G subpixel 11G of input image data $D_{IN}$ may be referred to as input image data $D_{IN}^G$ and data indicating the grayscale level of a B subpixel 11B of input image data $D_{IN}$ may be referred to as input image data $D_{IN}^B$. The synchronization data $D_{SYNC}$ are used to control the operation timing of the driver IC 3; the generation timing of various timing control signals in the driver IC 3 (including the vertical synchronization signal $V_{SYNC}$ and the horizontal synchronization signal $H_{SYNC}$) is controlled in response to the synchronization data $D_{SYNC}$. Also, the gate line control signals $S_{GIP}$ are generated in response to the synchronization data $D_{SYNC}$. The driver IC 3 is mounted on the LCD panel 2 with a surface mounting technology such as a COG (chip on glass) technology.

Figure 3:
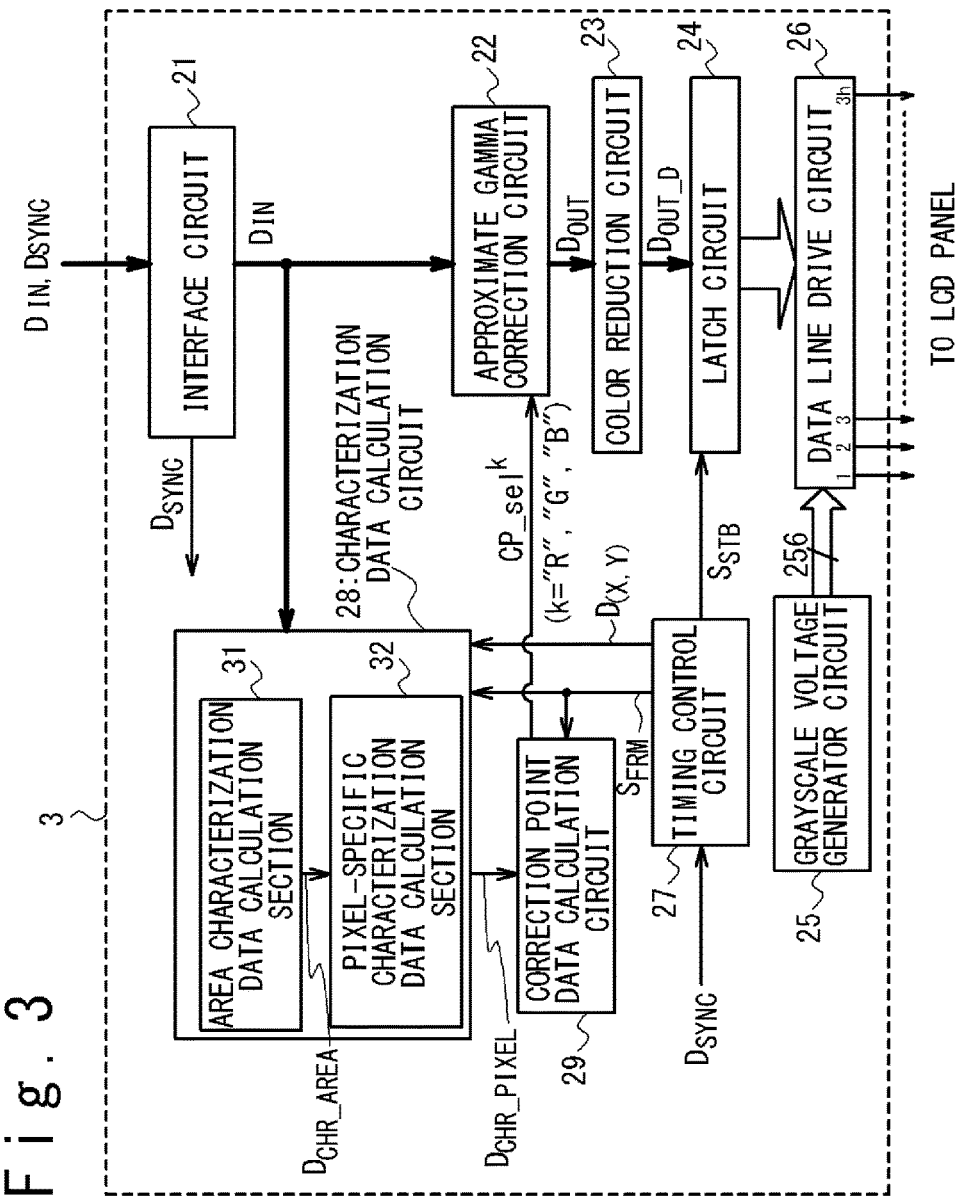
FIG. 3 is a block diagram illustrating an example of the configuration of a driver IC in the present embodiment.

FIG. 3 is a block diagram illustrating an example of the configuration of the driver IC 3. The driver IC 3 includes an interface circuit 21, an approximate gamma correction circuit 22, a color reduction circuit 23, a latch circuit 24, a grayscale voltage generator circuit 25, a data line drive circuit 26, a timing control circuit 27, a characterization data calculation circuit 28 and a correction point data calculation circuit 29.

The interface circuit 21 receives the input image data $D_{IN}$ and synchronization data $D_{SYNC}$ from the processor 4 and forwards the input image data $D_{IN}$ to the approximate gamma correction circuit 22 and the synchronization data $D_{SYNC}$ to the timing control circuit 27.

The approximate gamma correction circuit 22 performs a correction calculation (or gamma correction) on the input image data $D_{IN}$ in accordance with a gamma curve specified by correction point data set $CP\_sel^k$ received from the correction point data calculation circuit 29, to thereby generate output image data $D_{OUT}$. In the following, data indicating the grayscale level of an R subpixel 11R of the output image data $D_{OUT}$ may be referred to as output image data $D_{OUT}^R$. Correspondingly, data indicating the grayscale level of a G subpixel 11G of the output image data $D_{OUT}$ may be referred to as output image data $D_{OUT}^G$ and data indicating the grayscale level of a B subpixel 11B of the output image data $D_{OUT}$ may be referred to as output image data $D_{OUT}^B$.

The number of bits of the output image data $D_{OUT}$ is larger than that of the input image data $D_{IN}$. This effectively avoids losing information of the grayscale levels of pixels in the correction calculation. In the present embodiment, in which the input image data $D_{IN}$ represent the grayscale level of each subpixel 11 of each pixel 9 with eight bits, the output image data $D_{OUT}$ may be, for example, generated as data that represent the grayscale level of each subpixel 11 of each pixel 9 with 10 bits.

Although a gamma correction is most typically achieve with an LUT (lookup table), the gamma correction performed by the approximate gamma correction circuit 22 in the present embodiment is achieved with an arithmetic expression, without using an LUT. Exclusion of an LUT from the approximate gamma correction circuit 22 effectively allows reducing the circuit size of the approximate gamma correction circuit 22 and also reducing the power consumption necessary for switching the gamma value.

It should be noted however that the approximate gamma correction circuit 22 uses an approximate expression, not the exact expression, for achieving the gamma correction in the present embodiment. The approximate gamma correction circuit 22 determines coefficients of the approximate expression used for the gamma correction in accordance with a desired gamma curve to achieve a gamma correction with a desired gamma value. A gamma correction with the exact expression requires a calculation of an exponential function and this undesirably increases the circuit size. In the present embodiment, in contrast, the gamma correction is achieved with an approximate expression which does not include an exponential function to thereby reduce the circuit size.

The shape of the gamma curve used in the gamma correction performed by the approximate gamma correction circuit 22 is specified by correction point data sets $CP\_sel^R$, $CP\_sel^G$ or $CP\_sel^B$. To allow performing gamma corrections with different gamma values for the R subpixel 11R, G subpixel 11G and B subpixel 11B of each pixel 9, different correction point data sets are respectively prepared for the R subpixel 11R, G subpixel 11G and B subpixel 11B of each pixel 9 in the present embodiment. The correction point data set $CP\_sel^R$ is used for a gamma correction of input image data $D_{IN}^R$ associated with an R subpixel 11R. Correspondingly, the correction point data set $CP\_sel^G$ is used for a gamma correction of input image data $D_{IN}^G$ associated with a G subpixel 11G and the correction point data set $CP\_sel^B$ is used for a gamma correction of input image data $D_{IN}^B$ associated with a B subpixel 11B.

Figure 4:
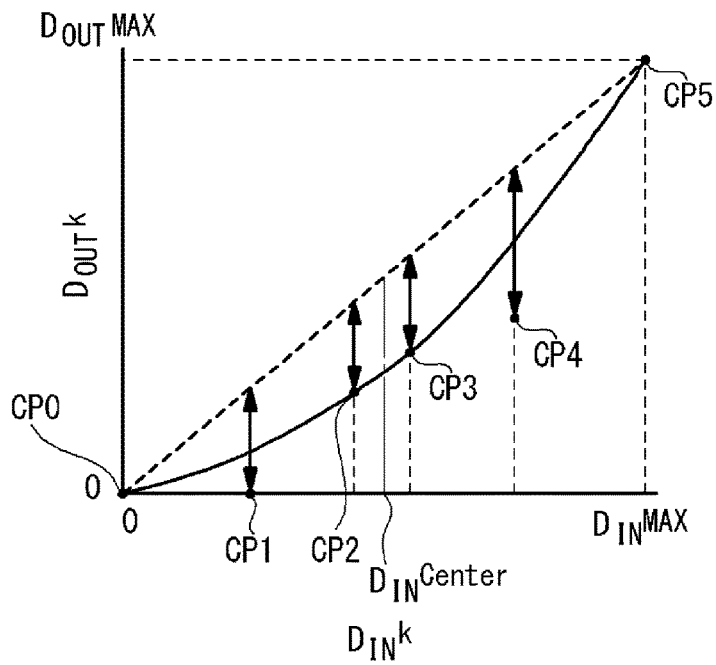
FIG. 4 illustrates a gamma curve specified by each correction point data set and contents of a correction calculation (or gamma correction) in accordance with the gamma curve.

FIG. 4 illustrates the gamma curve specified by each correction point data set $CP\_sel^k$ and contents of the gamma correction in accordance with the gamma curve. Each correction point data set $CP\_sel^k$ includes correction point data CP0 to CP5. The correction point data CP0 to CP5 are each defined as data indicating a point in a coordinate system in which input image data $D_{IN}^k$ are associated with the horizontal axis (or a first axis) and output image data $D_{OUT}^k$ are associated with the vertical axis (or a second axis). The correction point data CP0 and CP5 respectively indicate the positions of correction points which are also denoted by numerals CP0 and CP5 and defined at the both ends of the gamma curve. The correction point data CP2 and CP3 respectively indicate the positions of correction points which are also denoted by numerals CP2 and CP3 and defined on an intermediate section of the gamma curve. The correction point data CP1 indicate the position of a correction point which is also denoted by numeral CP1 and located between the correction points CP0 and CP2 and the correction point data CP4 indicate the position of a correction point CP4 which is also denoted by numeral CP4 and located between the correction points CP3 and CP5. The shape of the gamma curve is specified by appropriately determining the positions of the correction points CP1 to CP4 indicated by the correction point data CP1 to CP4.

As illustrated in FIG. 4, for example, it is possible to specify the shape of the gamma curve as being convex downward by determining the positions of the correction points CP1 to CP4 as being lower than the straight line connecting the both ends of the gamma curve. The approximate gamma correction circuits 22 generates the output image data $D_{OUT}^k$ by performing a gamma correction in accordance with the gamma curve with the shape specified by the correction point data CP0 to CP5 included in the correction point data set $CP\_sel^k$.

Figure 5:
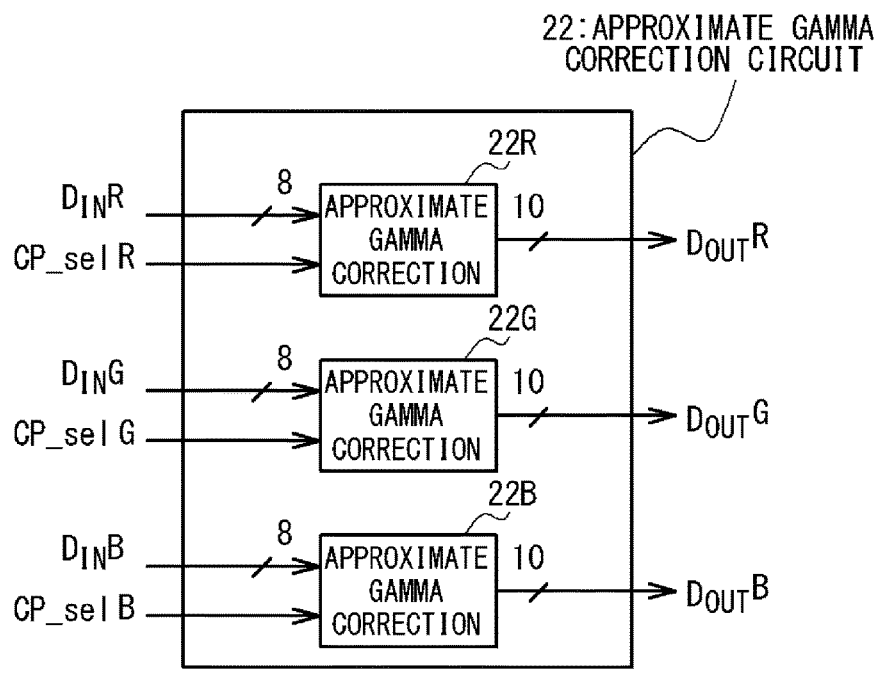
FIG. 5 is a block diagram illustrating an example of the configuration of an approximate gamma correction circuit in the present embodiment.

FIG. 5 is a block diagram illustrating an example of the configuration of the approximate gamma correction circuit 22. The approximate gamma correction circuit 22 includes approximate gamma correction units 22R, 22G and 22B, which are prepared for R subpixels 11R, G subpixels 11G and B subpixels 11B, respectively. The approximate gamma correction units 22R, 22G and 22B each perform a gamma correction with an arithmetic expression on the input image data $D_{IN}^R$, $D_{IN}^G$ and $D_{IN}^B$, respectively, to generate the output image data $D_{OUT}^R$, $D_{OUT}^G$ and $D_{OUT}^B$, respectively. As described above, the number of bits of the output image data $D_{OUT}^R$, $D_{OUT}^G$ and $D_{OUT}^B$ is ten bits; this means that the number of bits of the output image data $D_{OUT}^R$, $D_{OUT}^G$ and $D_{OUT}^B$ is larger than that of the input image data $D_{IN}^R$, $D_{IN}^G$ and $D_{IN}^B$.

The coefficients of the arithmetic expression used for the gamma correction by the approximate gamma correction unit 22R are determined on the basis of the correction point data CP0 to CP5 of the correction point data set $CP\_sel^R$.

Correspondingly, the coefficients of the arithmetic expressions used for the gamma corrections by the approximate gamma correction units 22G and 22B are determined on the basis of the correction point data CP0 to CP5 of the correction point data set CP_sel$^G$ and CP_sel$^B$, respectively.

The approximate gamma correction units 22R, 22G and 22B have the same function except for that the input image data and the correction point data sets fed thereto are different. The approximate gamma correction units 22R, 22G and 22B may be referred to as approximate gamma correction unit 22k if the approximate gamma correction units 22R and 22G and 22B are not distinguished from each other.

Referring back to FIG. 3, the color reduction circuit 23, the latch circuit 24, the grayscale voltage generator circuit 25 and the data line drive circuit 26 function in total as a drive circuitry which drives the data lines 8 of the display region 5 of the LCD panel 2 in response to the output image data $D_{OUT}$ generated by the approximate gamma correction circuit 22. Specifically, the color reduction circuit 23 performs a color reduction on the output image data $D_{OUT}$ generated by the approximate gamma correction circuit 22 to generate color-reduced image data $D_{OUT\_D}$. The latch circuit 24 latches the color-reduced image data $D_{OUT\_D}$ from the color reduction circuit 23 in response to a latch signal $S_{STB}$ received from the timing control circuit 27 and forwards the color-reduced image data $D_{OUT\_D}$ to the data line drive circuit 26. The grayscale voltage generator circuit 25 feeds a set of grayscale voltages to the data line drive circuit 26. In one embodiment, the number of the grayscale voltages fed from the grayscale voltage generator circuit 25 may be 256 (=$2^8$) in view of the configuration in which the grayscale level of each subpixel 11 of each pixel 9 is represented with eight bits. The data line drive circuit 26 drives the data lines 8 of the display region 5 of the LCD panel 2 in response to the color-reduced image data $D_{OUT\_D}$ received from the latch circuit 24. In detail, the data line drive circuit 26 selects desired grayscale voltages from the set of the grayscale voltages received from the grayscale voltage generator circuit 25 in response to color-reduced image data $D_{OUT\_D}$, and drives the corresponding data lines 8 of the LCD panel 2 to the selected grayscale voltages.

The timing control circuit 27 performs timing control of the entire drive IC 3 in response to the synchronization data $D_{SYNC}$. In detail, the timing control circuit 27 generates the latch signal $S_{STB}$ in response to the synchronization data $D_{SYNC}$ and feeds the generated latch signal $S_{STB}$ to the latch circuit 24. The latch signal $S_{STB}$ is a control signal instructing the latch circuit 24 to latch the color-reduced data $D_{OUT\_D}$. Furthermore, the timing control circuit 27 generates a frame signal $S_{FRM}$ in response to the synchronization data $D_{SYNC}$ and feeds the generated frame signal $S_{FRM}$ to the characterization data calculation circuit 28 and the correction point data calculation circuit 29. It should be noted here that the frame signal $S_{FRM}$ is a control signal which informs the characterization data calculation circuit 28 and the correction point data calculation circuit 29 of the start of each frame period; the frame signal $S_{FRM}$ is asserted at the beginning of each frame period. A vertical sync signal $V_{SYNC}$ generated in response to the synchronization data $D_{SYNC}$ may be used as the frame signal $S_{FRM}$. The timing control circuit 27 also generates coordinate data $D_{(X, Y)}$ indicating the coordinates of the pixel 9 for which the input image data $D_{IN}$ currently indicate the grayscale levels of the respective subpixels 11 thereof. When input image data $D_{IN}$ which describe the grayscale levels of the respective subpixels 11 of a certain pixel 9 are fed to the characterization data calculation circuit 28, the timing control circuit 27 feeds coordinate data $D_{(X, Y)}$ indicating the coordinates of the certain pixel 9 in the display region 5 to the characterization data calculation circuit 28.

The characterization data calculation circuit 28 and the correction point data calculation circuit 29 constitute a circuitry which generates the correction point data sets CP_sel$^R$, CP_sel$^G$ and CP_sel$^B$ in response to the input image data $D_{IN}$ and feeds the generated correction point data sets CP_sel$^R$, CP_sel$^G$ and CP_sel$^B$ to the approximate gamma correction circuit 22.

In detail, the characterization data calculation circuit 28 includes an area characterization data calculation section 31 and a pixel-specific characterization data calculation section 32. The area characterization data calculation section 31 calculates area characterization data $D_{CHR\_AREA}$ for each of a plurality of areas defined by dividing the display region 5 of the LCD panel 2. Here, the area characterization data $D_{CHR\_AREA}$ indicate one or more feature quantities of an image displayed in each area. As described later in detail, an appropriate contrast enhancement is achieved for each area in the present embodiment by generating each correction point data set CP_sel$^k$ in response to the area characterization data $D_{CHR\_AREA}$ and performing a correction calculation (or gamma correction) in accordance with the gamma curve defined by the correction point data set CP_sel$^k$. The contents and the generation method of the area characterization data $D_{CHR\_AREA}$ are described later in detail.

The pixel-specific characterization data calculation section 32 calculates pixel-specific characterization data $D_{CHR\_PIXEL}$ from the area characterization data $D_{CHR\_AREA}$ received from the area characterization data calculation section 31. The pixel-specific characterization data $D_{CHR\_PIXEL}$ are calculated for each pixel 9 in the display region 5; pixel-specific characterization data $D_{CHR\_PIXEL}$ associated with a certain pixel 9 are calculated by applying filtering to area characterization data $D_{CHR\_AREA}$ calculated for the area in which the certain pixel 9 is located and area characterization data $D_{CHR\_AREA}$ calculated for the areas adjacent to the area in which the certain pixel 9 is located. This implies that pixel-specific characterization data $D_{CHR\_PIXEL}$ associated with a certain pixel 9 indicate feature quantities of the image displayed in the region around the certain pixel 9. The contents and the generation method of the pixel-specific characterization data $D_{CHR\_PIXEL}$ are described later in detail.

The correction point data calculation circuit 29 generates the correction point data sets CP_sel$^R$, CP_sel$^G$ and CP_sel$^B$ in response to the pixel-specific characterization data $D_{CHR\_PIXEL}$ received from the pixel-specific characterization data calculation section 32 and feeds the generated correction point data sets CP_sel$^R$, CP_sel$^G$ and CP_sel$^B$ to the approximate gamma correction circuit 22. The correction point data calculation circuit 29 and the approximate gamma correction circuit 22 constitute a correction circuitry which generates the output image data $D_{OUT}$ by performing a correction on the input image data $D_{IN}$ in response to the pixel-specific characterization data $D_{CHR\_PIXEL}$.

Next, a description is given of an exemplary operation of the liquid crystal display device 1 in the present embodiment, in particular, the correction calculation performed on the input image data $D_{IN}$ (that is, the operations of the characterization data calculation circuit 28, the correction point data calculation circuit 29 and the approximate gamma correction circuit 22).

One feature of the liquid crystal display device 1 of the present embodiment is that area characterization data $D_{CHR\_AREA}$ indicating one or more feature quantities of an image displayed in each of a plurality of areas defined by dividing the display region 5 of the LCD panel 2 are calculated for each of the areas and a correction calculation (or contrast enhancement) is performed on the input image data $D_{IN}$ associated with the pixels 9 located in each area, depending on area characterization data $D_{CHR\_AREA}$ calculated for each area. This operation effectively allows performing a correction calculation suitable for each area. When the display region 5 includes an area in which a dark image is displayed and an area in which a bright image is displayed, for example, the above-described operation provides an image correction suitable for each area. This effectively improves the image quantity.

In the meantime, this method of the present embodiment, in which area characterization data $D_{CHR\_AREA}$ are calculated for each area and a correction calculation is performed in response to the calculated area characterization data $D_{CHR\_AREA}$, may cause a problem of generation of block noise at the boundaries between adjacent areas as is the case with the technique disclosed in the above-mentioned Japanese Patent Application Publication No. 2004-23522 A, since different correction calculations are potentially performed for pixels located in adjacent areas.

In order to address such problem, in the present embodiment, pixel-specific characterization data $D_{CHR\_PIXEL}$ are calculated for each pixel 9 by applying filtering to the area characterization data $D_{CHR\_AREA}$, and a correction calculation depending on the pixel-specific characterization data $D_{CHR\_PIXEL}$ calculated for each pixel 9 is performed on the input image data $D_{IN}$ associated with each pixel 9. In detail, pixel-specific characterization data $D_{CHR\_PIXEL}$ associated with a certain pixel 9 are calculated by applying filtering to the area characterization data $D_{CHR\_AREA}$ calculated for the area in which the certain pixel 9 is located and the area characterization data $D_{CHR\_AREA}$ calculated for the areas around the area in which the certain pixel 9 is located (or the areas adjacent to the area in which the certain pixel 9 is located). This approach effectively reduces block noise at the boundaries between adjacent areas. In the following, a description is given of details of the correction calculation performed on the input image data $D_{IN}$.

Figure 6:
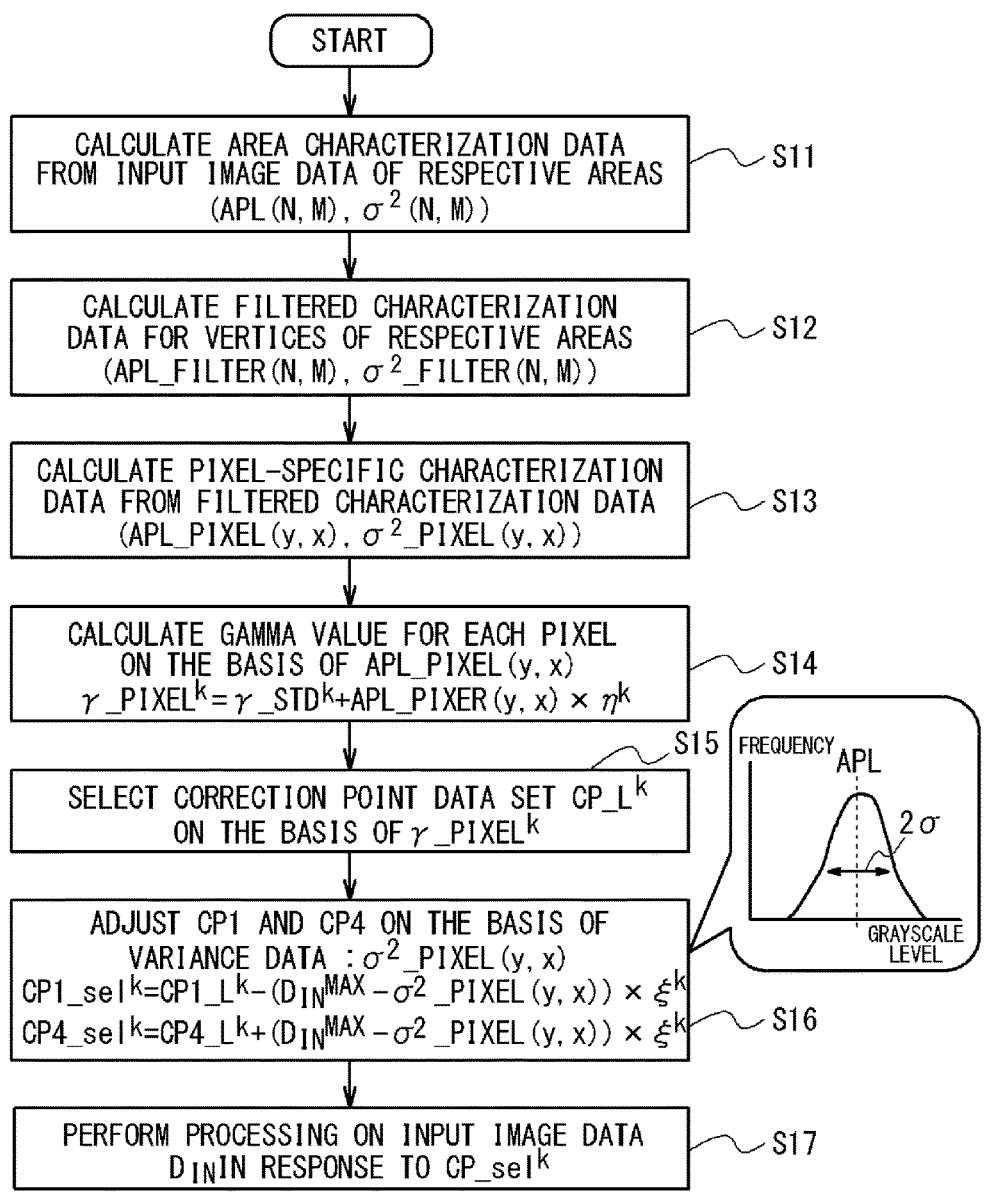
FIG. 6 is a flow chart illustrating an exemplary procedure of the correction calculation performed on input image data in the present embodiment.

FIG. 6 is a flowchart illustrating an exemplary procedure of the correction calculation performed on the input image data $D_{IN}$. The input image data $D_{IN}$ are fed to the area characterization data calculation section 31 of the characterization data calculation circuit 28 and the area characterization data calculation section 31 calculates the area characterization data $D_{CHR\_AREA}$ from the input image data $D_{IN}$ (at step S11). As described above, the area characterization data $D_{CHR\_AREA}$ indicate one or more feature quantities of an image displayed in each of the areas defined by dividing the display region 5 of the LCD panel 2.

Figure 7:
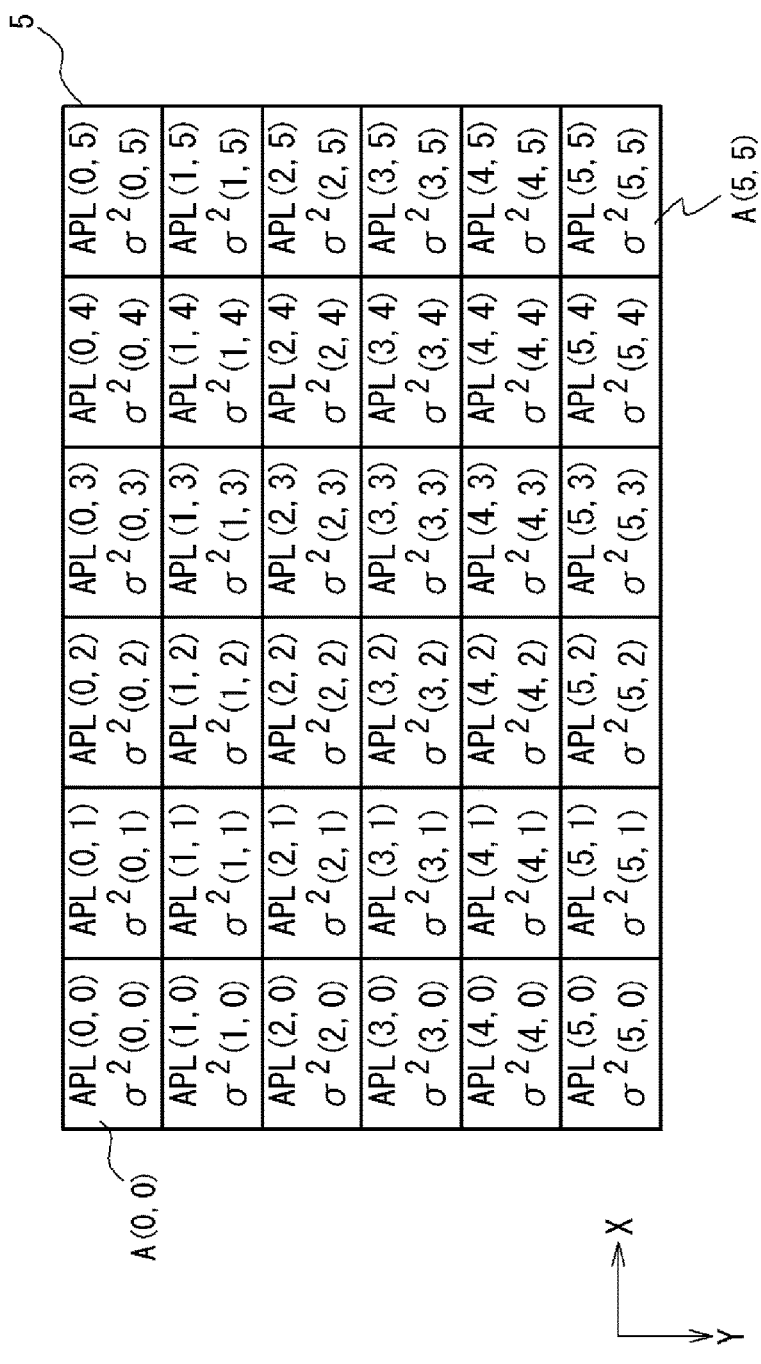
FIG. 7 is a diagram illustrating areas defined in the display region of an LCD panel and contents of area characterization data calculated for each area.

FIG. 7 illustrates the areas defined in the display region 5 and the contents of the area characterization data $D_{CHR\_AREA}$ calculated for each of the areas. In the following, the horizontal direction of the display region 5 (the direction in which the gate lines 7 are extended) may be referred to as the X-axis direction and the vertical direction of the display region 5 (the direction in which the data lines 8 are extended) may be referred to as the Y-axis direction.

The display region 5 of the LCD panel 2 is divided into a plurality of areas, as described above. In the example illustrated in FIG. 7, the display region 5 is divided into 36 rectangular areas arranged in six rows and six columns. In the following, each area of the display region 5 may be denoted by A(N, M), where N is an index indicating the row in which the area is located and M is an index indicating the column in which the area is located. In the example illustrated in FIG. 7, N and M are both an integer from zero to five. When the display region 5 of the LCD panel 2 is configured to include 1920×1080 pixels, the X-axis direction pixel number Xarea, which is the number of pixels 9 arrayed in the X-axis direction in each area, is 320 (=1920/6) and the Y-axis direction pixel number Yarea, which is the number of pixels 9 arrayed in the Y-axis direction in each area, is 180 (=1080/6). Furthermore, the total area pixel number Data_Count, which is the number of pixels included in each area, is 57600 (=1920/6×1080/6).

In the present embodiment, the area characterization data DCHR_AREA includes APL data indicating the APL (average picture level) of an image displayed in each area and variance data indicating the variance $\sigma^2$ of the luminance values of pixels 9 of each area. The APL of each area is calculated as the average values of the luminance values Y of the pixels 9 in each area. The luminance value Y of each pixel 9 is calculated by performing a color transformation (for example, an RGB-YUV transformation and an RGB-YCbCr transformation) on the grayscale levels of the R subpixel 11R, G subpixel 11G and B subpixel 11B of the pixel 9, which are described in the input image data $D_{IN}$. In the following, the APL of the area A(N, M) may be referred to as APL(N, M) and the variance of the luminance values Y of the pixels 9 in the area A(N, M) may be referred to as $\sigma^2(N, M)$.

In one embodiment, the APL data and variance data of area A(N, M) (that is, APL(N, M) of area A(N, M) and variance $\sigma^2(N, M)$ of the luminance values of the pixels 9 in the area A(N, M)) are calculated in accordance with the following expressions (1) and (2):

$$APL(N, M) = \frac{\sum Y_j}{\text{Data\_Count}} \quad (1)$$

$$\sigma^2(N, M) = \frac{\sum (Y_j)^2}{\text{Data\_Count}} - \{APL(N, M)\}^2 \quad (2)$$

where Data_Count is the number of the pixels 9 included in each area A(N, M), $Y_j$ is the luminance value of each pixel 9 and $\Sigma$ represents the sum with respect to area A(N, M).

Figure 8:
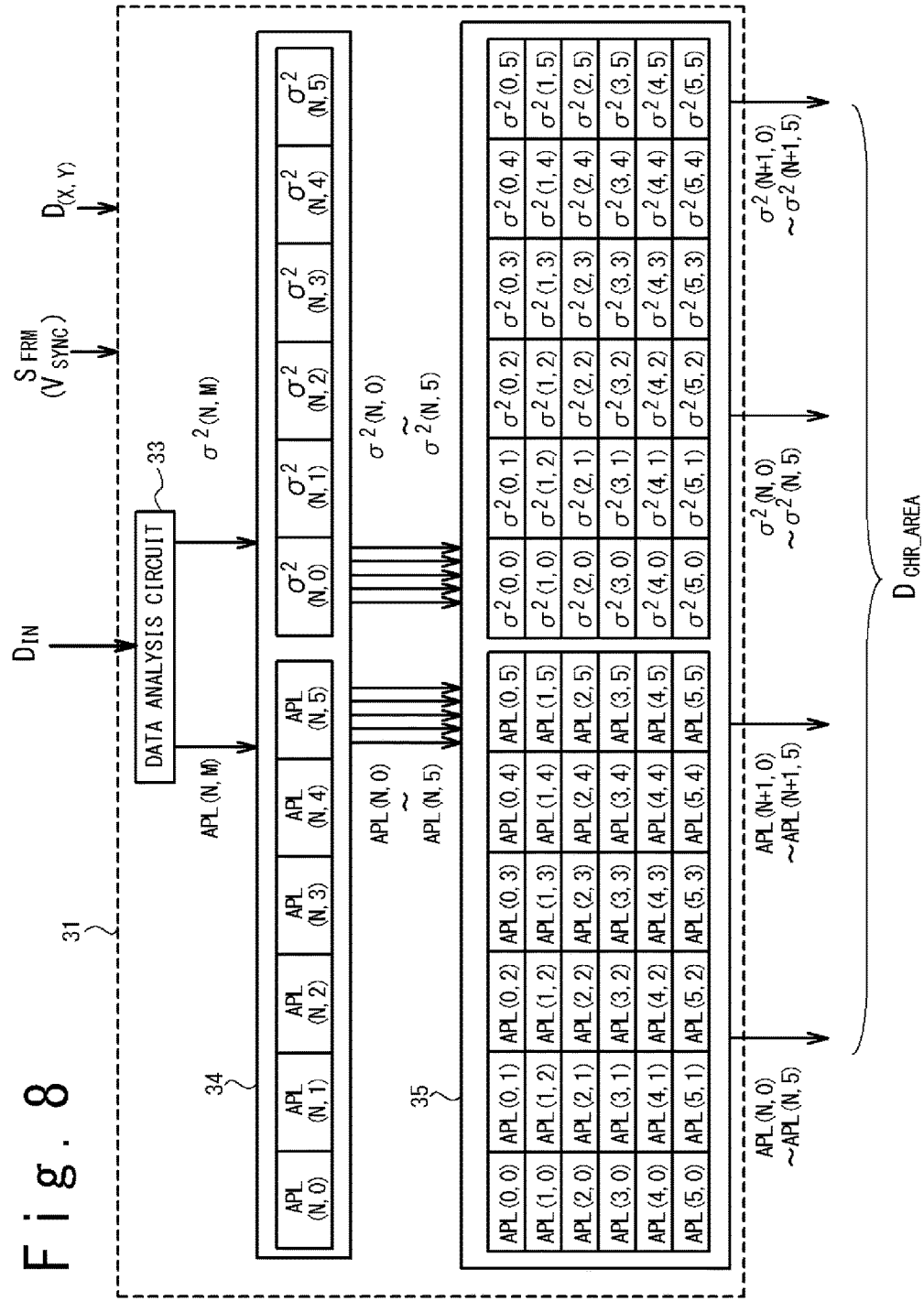
FIG. 8 is a block diagram illustrating a preferred example of the configuration of an area characterization data calculation section in the present embodiment.

FIG. 8 is a block diagram illustrating one preferred example of the configuration of the area characterization data calculation section 31, which calculates the area characterization data $D_{CHR\_AREA}$. In one embodiment, the area characterization data calculation section 31 includes a data analysis circuit 33, a calculation result storage memory 34 and an area characterization data memory 35.

The data analysis circuit 33 calculates APL(N, M) and variance $\sigma^2(N, M)$ for each area A(N, M) from input image data $D_{IN}$ associated with the pixels 9 included in each area A(N, M). In this calculation, the data analysis circuit 33 recognizes the pixel 9 with which the current input image data $D_{IN}$ are associated on the basis of the frame signal $S_{FRM}$ and the coordinate data $D_{(X, Y)}$ received from the timing control circuit 27.

The calculation result storage memory 34 sequentially receives and stores APL(N, M) and $\sigma^2(N, M)$ calculated by the data analysis circuit 33. The calculation result storage memory 34 is configured to store area characterization data $D_{CHR\_AREA}$ for one row of areas A(N, 0) to A(N, 5) (that is, APL(N, 0) to APL(N, 5) and $\sigma^2(N, 0)$ to $\sigma^2(N, 5)$. The calculation result storage memory 34 also has the function of transferring the area characterization data $D_{CHR\_AREA}$ of one row of the areas A(N, 0) to A(N, 5) stored therein to the area characterization data memory 35.

The area characterization data memory 35 sequentially receives the area characterization data $D_{CHR\_AREA}$ from the calculation result storage memory 34 in units of rows of areas (where each row includes areas A(N, 0) to A(N, 5)), and stores the received area characterization data $D_{CHR\_AREA}$. The area characterization data memory 35 is configured to store area characterization data DCHR_AREA for all the areas A(0, 0) to A(5, 5) in the display region 5. The area characterization data memory 35 also has the function of outputting area characterization data $D_{CHR\_AREA}$ associated with adjacent two rows of areas A(N, 0) to A(N, 5) and A(N+1, 0) to A(N+1, 5), out of the area characterization data $D_{CHR\_AREA}$ stored therein.

Referring back to FIG. 6, the area characterization data $D_{CHR\_AREA}$ are fed to the pixel-specific characterization data calculation section 32. In the pixel-specific characterization data calculation section 32, the pixel-specific characterization data $D_{CHR\_PIXEL}$ are calculated by applying filtering to the area characterization data $D_{CHR\_AREA}$ (at steps S12 and S13).

In detail, filtered characterization data $D_{CHR\_FILTER}$ are first calculated from the area characterization data $D_{CHR\_AREA}$ (at step S12). It should be noted here that the filtered characterization data $D_{CHR\_FILTER}$ indicate one or more feature quantities calculated for each vertex of the areas. The filtered characterization data $D_{CHR\_FILTER}$ associated with a certain vertex are calculated from the area characterization data $D_{CHR\_AREA}$ associated with one or more areas which the certain vertex belongs to. This implies that the filtered characterization data $D_{CHR\_FILTER}$ associated with a certain vertex indicate the feature quantities of an image displayed in the region around the certain vertex.

Figure 9:
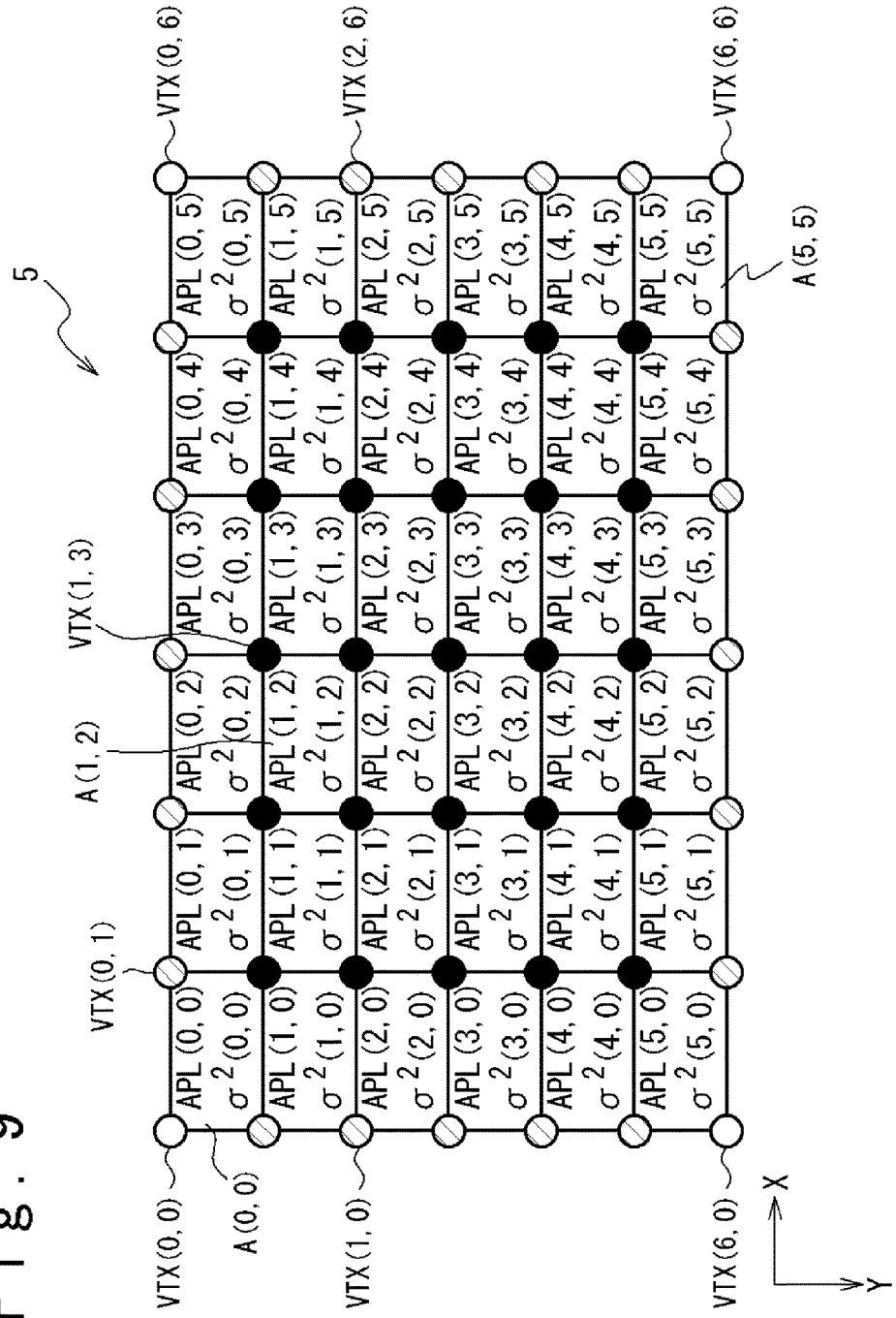
FIG. 9 is a diagram illustrating contents of filtered characterization data in the present embodiment.

FIG. 9 is a diagram illustrating the contents of the filtered characterization data $D_{CHR\_FILTER}$. In the present embodiment, each area is rectangular and has four vertices. Since adjacent areas share vertices, the vertices of the areas are arrayed in rows and columns in the display region 5. When the display region 5 includes areas arrayed in six rows and six columns, for example, the vertices are arrayed in seven rows and seven columns. Each vertex of the areas defined in the display region 5 may be denoted by VTX(N, M), hereinafter, where N is an index indicating the row in which the vertex is located and M is an index indicating the column in which the vertex is located.

Filtered characterization data $D_{CHR\_FILTER}$ associated with a certain vertex are calculated from the area characterization data $D_{CHR\_AREA}$ associated with the area(s) which the vertex belongs to. In the present embodiment, the area characterization data $D_{CHR\_AREA}$ include APL data and variance data, and accordingly, the filtered characterization data $D_{CHR\_FILTER}$ calculated for each vertex also include APL data and variance data.

It should be noted that there are three types of vertices in the display region 5. The calculation method of the filtered characterization data $D_{CHR\_FILTER}$ associated with a certain vertex depends on the type of the vertex.

(1) Vertices Located at the Four Corners of the Display Region 5

The four vertices VTX(0, 0), VTX(0, Mmax), VTX(Nmax, 0), and VTX(Nmax, Mmax) positioned at the four corners of the display region 5 each belong to a single area, where Nmax and Mmax are the maximum values of the indices N and M which respectively represent the row and column in which the vertex is positioned; in the present embodiment, in which the vertices are arrayed in seven rows and seven columns, Nmax and Mmax are both six.

The area characterization data $D_{CHR\_AREA}$ associated with the areas which the four vertices positioned at the four corners of the display region 5 respectively belong to are used as filtered characterization data $D_{CHR\_FILTER}$ associated with the four vertices, without modification. More specifically, APL data and variance data of the filtered characterization data $D_{CHR\_FILTER}$ associated with the four vertices are obtained as follows:

$$\text{APL\_FILTER}(0,0) = \text{APL}(0,0), \tag{3a}$$

$$\sigma^2\_\text{FILTER}(0,0) = \sigma^2(0,0), \tag{3b}$$

$$\text{APL\_FILTER}(0,M\text{max}) = \text{APL}(0,M\text{max}-1), \tag{3c}$$

$$\sigma^2\_\text{FILTER}(0,M\text{max}) = \sigma^2(0,M\text{max}-1), \tag{3d}$$

$$\text{APL\_FILTER}(N\text{max},0) = \text{APL}(N\text{max}-1,0), \tag{3e}$$

$$\sigma^2\_\text{FILTER}(N\text{max},0) = \sigma^2(N\text{max}-1,0) \tag{3f}$$

$$\text{APL\_FILTER}(N\text{max},M\text{max}) = \text{APL}(N\text{max}-1,M\text{max}-1), \text{ and} \tag{3g}$$

$$\sigma^2\_\text{FILTER}(N\text{max},M\text{max}) = \sigma^2(N\text{max}-1,M\text{max}-1), \tag{3h}$$

where APL_FILTER(i, j) is the value of APL data associated with the vertex VTX(i, j) and $\sigma^2\_$FILTER(i, j) is the value of variance data associated with the vertex VTX(i, j). As described above, APL(i, j) is the APL of the area A(i, j) and $\sigma^2(i, j)$ is the variance of the luminance values of the pixels 9 in the area A(i, j).

(2) The Vertices Positioned on the Four Sides of the Display Region 5

The vertices positioned on the four sides of the display region 5 (in the example illustrated FIG. 9, the vertices VTX(0, 1)–VTX(0, Mmax–1), VTX(Nmax, 1)–VTX(Nmax, Mmax–1), VTX(1, 0)–VTX(Nmax–1, 0) and VTX(1, Mmax) to VTX(Nmax–1, Mmax)) belong to the adjacent two areas. APL data of filtered characterization data $D_{CHR\_FILTER}$ associated with the vertices positioned on the four sides of the display region 5 are respectively defined as the average values of the APL data of the area characterization data $D_{CHR\_AREA}$ associated with the two adjacent areas to which the vertices each belong to, and variance data of filtered characterization data $D_{CHR\_FILTER}$ associated with the vertices positioned on the four sides of the display region 5 are respectively defined as the average values of the variance data of the area characterization data $D_{CHR\_AREA}$ associated with the two adjacent areas to which the vertices each belong to.

More specifically, the APL data and variance data of filtered characterization data $D_{CHR\_FILTER}$ associated with the vertices positioned on the four sides of the display region 5 are obtained as follows:

$$\text{APL\_FILTER}(0,M) = \{\text{APL}(0,M-1) + \text{APL}(0,M)\}/2, \tag{4a}$$

$$\sigma^2\_\text{FILTER}(0,M) = \{\sigma^2(0,M-1) + \sigma^2(0,M)\}/2, \tag{4b}$$

$$\text{APL\_FILTER}(N,0) = \{\text{APL}(N-1,0) + \text{APL}(N,0)\}/2 \tag{4c}$$

$$\sigma^2\_\text{FILTER}(N,0) = \{\sigma^2(N-1,0) + \sigma^2(N,0)\}/2, \tag{4d}$$

$$\text{APL\_FILTER}(N\text{max},M) = \{\text{APL}(N\text{max},M-1) + \text{APL}(N\text{max},M)\}/2, \tag{4e}$$

$$\sigma^2\_\text{FILTER}(N\text{max},M) = \{\sigma^2(N\text{max},M-1) + \sigma^2(N\text{max},M)\}/2 \tag{4f}$$

$$\text{APL\_FILTER}(N,M\text{max}) = \{\text{APL}(N-1,M\text{max}) + \text{APL}(N,M\text{max})\}/2, \text{ and} \tag{4g}$$

$$\sigma^2\_\text{FILTER}(N,M\text{max}) = \{(N-1,M\text{max}) + \sigma^2(N,M\text{max})\}/2, \tag{4h}$$

where M is an integer from one to Mmax–1 and N is an integer from one to Nmax–1.

(3) The Vertices Other than Those Described Above

The vertices which are located neither at the four corners of the display region 5 nor on the four sides (that is, the vertices located at intermediate positions) each belong to adjacent four areas arrayed in two rows and two columns. APL data of filtered characterization data $D_{CHR\_FILTER}$ associated with the vertices which are located neither at the four corners of the display region 5 nor on the four sides are respectively defined as the average values of the APL data of the area characterization data $D_{CHR\_AREA}$ associated with the four areas to which the vertices each belong to, and variance data of filtered characterization data $D_{CHR\_FILTER}$ associated with such vertices are respectively defined as the average values of the variance data of the area characterization data $D_{CHR\_AREA}$ associated with the four areas to which the vertices each belong to.

More specifically, the APL data and variance data of filtered characterization data $D_{CHR\_FILTER}$ associated with this type of vertices are obtained as follows:

$$\text{APL\_FILTER}(N,M) = \{\text{APL}(N-1,M-1) + \text{APL}(N-1,M) + \text{APL}(N,M-1) + \text{APL}(N,M)\}/4, \text{ and} \quad (5a)$$

$$\sigma^2\_\text{FILTER}(N,M) = \{\sigma^2(N-1,M-1) + \sigma^2(N-1,M) + \sigma^2(N,M-1) + \sigma^2(N,M)\}/4. \quad (5b)$$

Referring back to FIG. 6, the pixel-specific characterization data calculation section 32 further calculates the pixel-specific characterization data $D_{CHR\_PIXEL}$ with a linear interpolation of the filtered characterization data $D_{CHR\_FILTER}$ calculated as described above (at step S13). As described above, the pixel-specific characterization data $D_{CHR\_PIXEL}$ indicate feature quantities calculated for the respective pixels 9 in the display region 5. In the present embodiment, the filtered characterization data $D_{CHR\_FILTER}$ include APL data and variance data, and accordingly the pixel-specific data $D_{CHR\_PIXEL}$ also include APL data and variance data calculated for the respective pixels 9.

Figure 10:
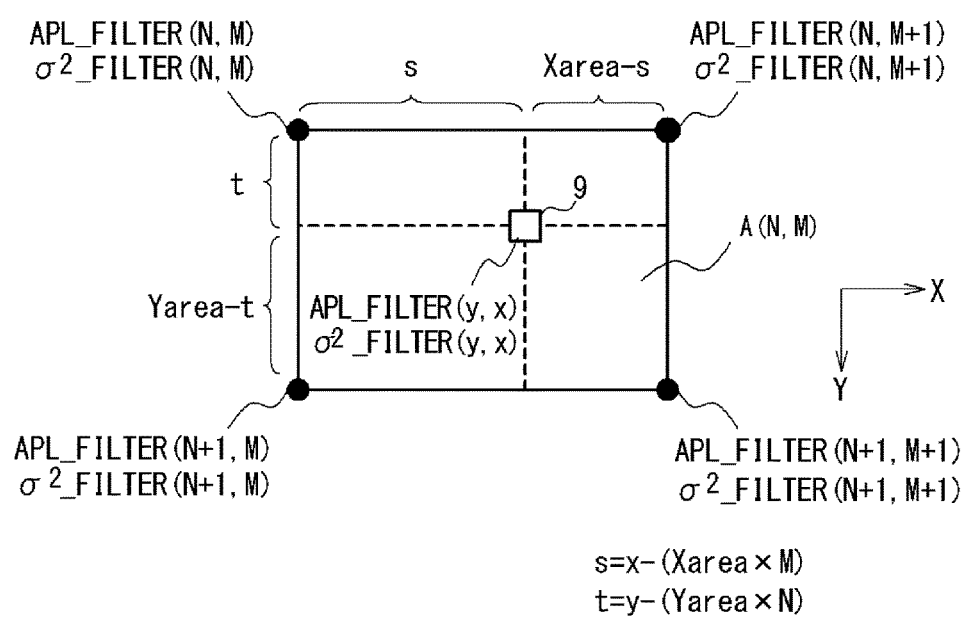
FIG. 10 is a conceptual diagram illustrating a calculation method of pixel-specific characterization data in the present embodiment.

FIG. 10 is a conceptual diagram illustrating an exemplary calculation method of pixel-specific characterization data $D_{CHR\_PIXEL}$ associated with a certain pixel 9 positioned in the area A(N, M).

In FIG. 10, s indicates the position of the pixel 9 in the area A(N, M) in the X-axis direction, and t indicates the position of the pixel 9 in the area A(N, M) in the Y-axis direction. The positions s and t are represented as follows:

$$s = x - (X\text{area} \times M), \text{ and} \quad (6a)$$

$$t = y - (Y\text{area} \times N), \quad (6b)$$

where x is the position represented in units of pixels in the display region 5 in the X-axis direction, Xarea is the number of pixels arrayed in the X-axis direction in each area, y is the position represented in units of pixels in the display region 5 in the Y-axis direction, and Yarea is the number of pixels arrayed in the Y-axis direction in each area. As described above, when the display region 5 of the LCD panel 5 includes 1920×1080 pixels and is divided into areas arrayed in six rows and six columns, Xarea (the number of pixels arrayed in the X-axis direction in each area) is 320 (=1920/6) and Yarea (the number of pixels arrayed in the Y-axis direction in each area) is 180 (=1080/6).

The pixel-specific characterization data $D_{CHR\_PIXEL}$ associated with each pixel 9 positioned in the area A(N, M) are calculated by applying a linear interpolation to the filtered characterization data $D_{CHR\_FILTER}$ associated with the four vertices of the area A(N, M) in accordance with the position of the specific pixel 9 in the area A(N, M). More specifically, pixel-specific characterization data $D_{CHR\_PIXEL}$ associated with a specific pixel 9 in the area A(N, M) are calculated in accordance with the following expressions:

$$\text{APL\_PIXEL}(y, x) = \quad (7a)$$
$$\frac{(Y\text{area} - t)}{Y\text{area}} \times \frac{\text{APL\_FILTER}(N, M+1) \times s + \text{APL\_FILTER}(N, M) \times (X\text{area} - s)}{X\text{area}} +$$
$$\frac{t}{Y\text{area}} \times \frac{\text{APL\_FILTER}(N+1, M+1) \times s + \text{APL\_FILTER}(N+1, M) \times (X\text{area} - s)}{X\text{area}}$$

$$\sigma^2\_\text{PIXEL}(y, x) = \frac{(Y\text{area} - t)}{Y\text{area}} \times \frac{\sigma^2\_\text{FILTER}(N, M+1) \times s + \sigma^2\_\text{FILTER}(N, M) \times (X\text{area} - s)}{X\text{area}} + \quad (7b)$$
$$\frac{t}{Y\text{area}} \times \frac{\sigma^2\_\text{FILTER}(N+1, M+1) \times s + \sigma^2\_\text{FILTER}(N+1, M) \times (X\text{area} - s)}{X\text{area}}$$

where APL_PIXEL(y, x) is the value of APL data calculated for a pixel 9 positioned at an X-axis direction position x and a Y-axis direction position y in the display region 5 and $\rho^2$_PIXEL(y, x) is the value of variance data calculated for the pixel 9.

The above-described processes at steps S12 and S13 would be understood as a whole as processing to calculate pixel-specific characterization data $D_{CHR\_PIXEL}$ associated with each pixel 9 by applying a sort of filtering to the area characterization data $D_{CHR\_AREA}$ associated with the area in which the pixel 9 of interest is located and the area characterization data $D_{CHR\_AREA}$ associated with the areas around (or adjacent to) the area in which the pixel 9 of interest is located, depending on the position of the pixel 9 of interest in the area in which the pixel 9 of interest is located.

It should be noted that the area characterization data $D_{CHR\_AREA}$ include APL data and variance data, and the pixel-specific characterization data $D_{CHR\_PIXEL}$ accordingly include APL data and variance data. In the processes at steps S12 and S13, APL data of pixel-specific characterization data $D_{CHR\_PIXEL}$ associated with each pixel 9 are calculated by applying a sort of filtering to the APL data of the area characterization data $D_{CHR\_AREA}$ associated with the area in which the pixel 9 of interest is located and the area characterization data $D_{CHR\_AREA}$ associated with the areas around (or adjacent to) the area in which the pixel 9 of interest is located, depending on the position of the pixel 9 of interest in the area in which the pixel 9 of interest is located. Correspondingly, variance data of pixel-specific characterization data $D_{CHR\_PIXEL}$ associated with each pixel 9 are calculated by applying a sort of filtering to the variance data of the area characterization data $D_{CHR\_AREA}$ associated with the area in which the pixel 9 of interest is located and the area characterization data $D_{CHR\_AREA}$ associated with the areas around (or adjacent to) the area in which the pixel 9 of interest is located, depending on the position of the pixel 9 of interest in the area in which the pixel 9 of interest is located.

Figure 11:
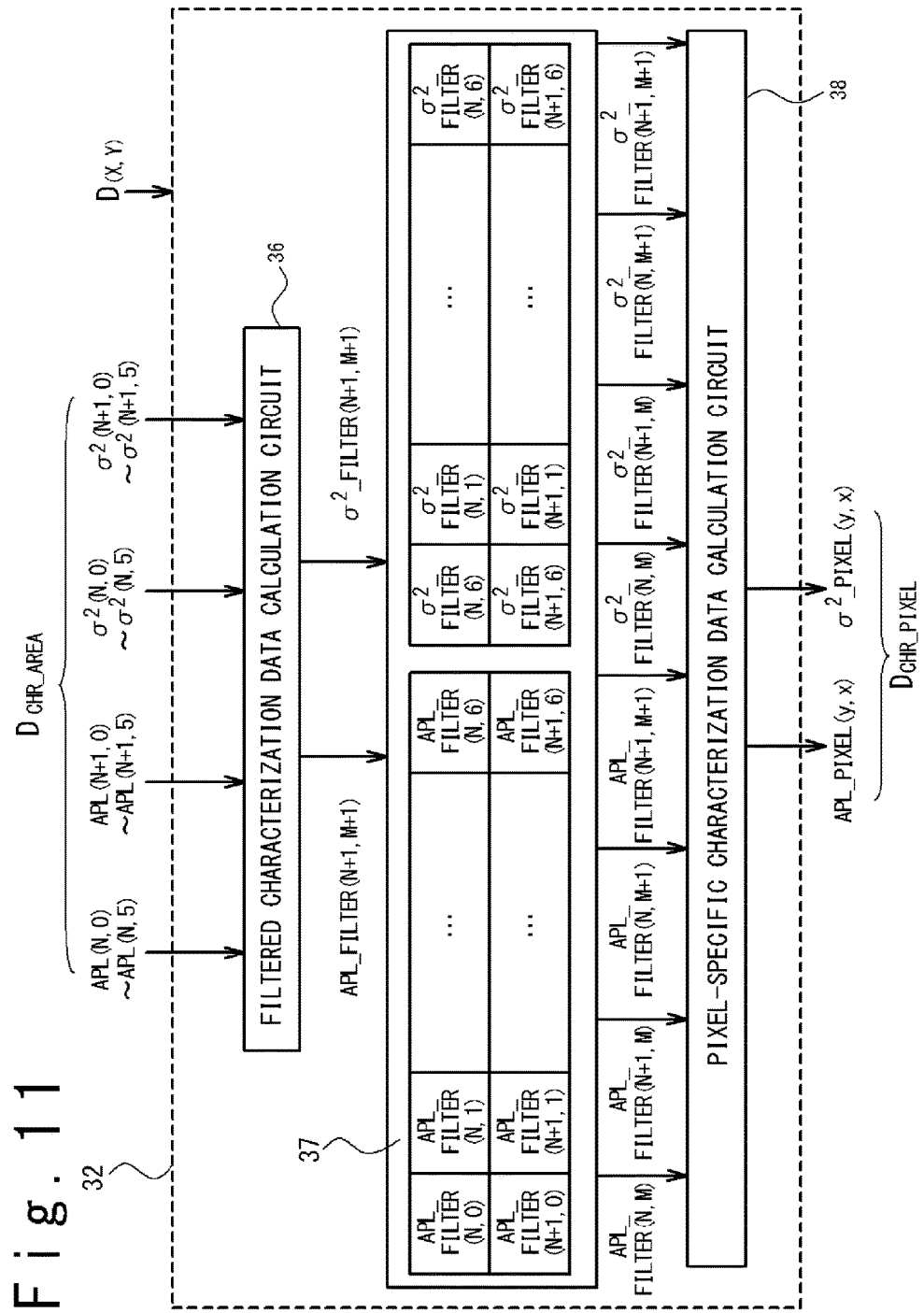
FIG. 11 is a block diagram illustrating a preferred example of the configuration of a pixel-specific characterization data calculation section in the present embodiment.

FIG. 11 is a block diagram illustrating one preferred example of the configuration of the pixel-specific characterization data calculation section 32 which performs the processes at steps S12 and S13. The pixel-specific characterization data calculation section 32 includes a filtered characterization data calculation circuit 36, a filtered characterization data memory 37 and a pixel-specific characterization data calculation circuit 38. The filtered characterization data calculation circuit 36 calculates filtered characterization data $D_{CHR\_FILTER}$ associated with the respective vertices from the area characterization data $D_{CHR\_AREA}$ received from the area characterization data memory 35 in the area characterization data calculation section 31. As described above, the filtered characterization data $D_{CHR\_FILTER}$ includes APL data and variance data. The filtered characterization data memory 37 stores therein the calculated filtered characterization data $D_{CHR\_FILTER}$. The filtered characterization data memory 37 has a memory capacity sufficient to store filtered characterization data $D_{CHR\_FILTER}$ for two rows of vertices. The pixel-specific characterization data calculation circuit 38 calculates pixel-specific characterization data $D_{CHR\_PIXEL}$ associated with each pixel 9 in accordance with the above-described expressions (7a) and (7b). The pixel-specific characterization data $D_{CHR\_PIXEL}$ are forwarded to the correction point data calculation circuit 29.

Referring back to FIG. 6, the correction point data calculation circuit 29 calculates gamma values to be used for the gamma correction of input image data $D_{IN}$ associated with each pixel 9 from the APL data of the pixel-specific characterization data $D_{CHR\_PIXEL}$ associated with each pixel 9 (at step S14). In the present embodiment, a gamma value is individually calculated for each of the R subpixel 11R, G subpixel 11G and B subpixel 11B of each pixel 9. More specifically, the gamma value to be used for the gamma correction of input image data $D_{IN}$ associated with the R subpixel 11R of a certain pixel 9 positioned at the X-axis direction position x and the Y-axis direction position y in the display region 5 is calculated in accordance with the following expression:

$$\gamma\_PIXEL^R = \gamma\_STD^R + APL\_PIXEL(y,x) \cdot \eta^R, \quad (8a)$$

where $\gamma\_PIXEL^R$ is the gamma value to be used for the gamma correction of the input image data $D_{IN}$ associated with the R subpixel 11R of the certain pixel 9, $\gamma\_STD^R$ is a given reference gamma value and $\eta^R$ is a given positive proportionality constant. It should be noted that, in accordance with expression (8a), the gamma value $\gamma\_PIXEL^R$ increases as APL_PIXEL(y, x) increases.

Correspondingly, the gamma values to be used for the gamma corrections of input image data $D_{IN}$ associated with the G subpixel 11G and B subpixel 11B of the certain pixel 9 positioned at the X-axis direction position x and the Y-axis direction position y in the display region 5 are respectively calculated in accordance with the following expressions:

$$\gamma\_PIXEL^G = \gamma\_STD^G + APL\_PIXEL(y,x) \cdot \eta^G, \text{ and} \quad (8b)$$

$$\gamma\_PIXEL^B = \gamma\_STD^B + APL\_PIXEL(y,x) \cdot \eta^B, \quad (8c)$$

where $\gamma\_PIXEL^G$ and $\gamma\_PIXEL^B$ are the gamma values to be respectively used for the gamma corrections of the input image data $D_{IN}$ associated with the G subpixel 11G and B subpixel 11B of the certain pixel 9, $\gamma\_STD^G$ and $\gamma\_STD^B$ are given reference gamma values and $\eta^G$ and $\eta^B$ are given proportionality constants. $\gamma\_STD^R$, $\gamma\_STD^G$ and $\gamma\_STD^B$ may be equal to each other, or different, and $\eta^R$, $\eta^G$ and $\eta^B$ may be equal to each other, or different. It should be noted that the gamma values $\gamma\_PIXEL^R$, $\gamma\_PIXEL^G$ and $\gamma\_PIXEL^B$ are calculated for each pixel 9.

This is followed by selecting or determining correction point data sets $CP\_L^R$, $CP\_L^G$ and $CP\_L^B$ on the basis of the calculated gamma values $\gamma\_PIXEL^R$, $\gamma\_PIXEL^G$ and $\gamma\_PIXEL^B$, respectively (at step S15). It should be noted that the correction point data sets $CP\_L^R$, $CP\_L^G$ and $CP\_L^B$ are seed data used for calculating the correction point data sets $CP\_sel^R$, $CP\_sel^G$ and $CP\_sel^B$, which are finally fed to the approximate gamma correction circuit 22. The correction point data sets $CP\_L^R$, $CP\_L^G$ and $CP\_L^B$ are determined for each pixel 9. As described later, the correction point data sets $CP\_sel^R$, $CP\_sel^G$ and $CP\_sel^B$ finally fed to the approximate gamma correction circuit 22 are determined by modifying the correction point data sets $CP\_L^R$, $CP\_L^G$ and $CP\_L^B$ on the basis of the variance data of the pixel-specific characterization data $D_{CHR\_PIXEL}$.

In one embodiment, the correction point data sets $CP\_L^R$, $CP\_L^G$ and $CP\_L^B$ are determined as follows: A plurality of correction point data sets CP#1 to CP#m are stored in the correction point data calculation circuit 29 and the correction point data sets $CP\_L^R$, $CP\_L^G$ and $CP\_L^B$ are each selected from among the correction point data sets CP#1 to CP#m. The correction point data sets CP#1 to CP#m correspond to different gamma values γ and each of the correction point data sets CP#1 to CP#m includes correction point data CP0 to CP5.

The correction point data CP0 to CP5 of a correction point data set CP#j corresponding to a certain gamma value γ are determined as follows: (1) For γ<1, $$CP0 = 0 \quad (9a)$$

$$CP1 = \frac{4 \cdot \text{Gamma}[K/4] - \text{Gamma}[K]}{2}$$

$$CP2 = \text{Gamma}[K-1]$$

$$CP3 = \text{Gamma}[K]$$

$$CP4 = 2 \cdot \text{Gamma}\left[(D_{IN}^{MAX} + K - 1)/2\right] - D_{OUT}^{MAX}$$

$$CP5 = D_{OUT}^{MAX}$$

and
(2) for γ≥1, $$CP0 = 0$$

$$CP1 = 2 \cdot \text{Gamma}[K/2] - \text{Gamma}[K]$$

$$CP2 = \text{Gamma}[K-1]$$

$$CP3 = \text{Gamma}[K]$$

$$CP4 = 2 \cdot \text{Gamma}[(D_{IN}^{MAX} + K - 1)/2] - D_{OUT}^{MAX}$$

$$CP5 = D_{OUT}^{MAX} \quad (9b)$$

where $D_{IN}^{MAX}$ is the allowed maximum value of the input image data $D_{IN}$, $D_{OUT}^{MAX}$ is the allowed maximum value of the output image data $D_{OUT}$ and K is a constant given by the following expression:

$$K = (D_{IN}^{MAX} + 1)/2. \quad (10)$$

In the above, the function Gamma [x], which is a function corresponding to the strict expression of the gamma correction, is defined by the following expression:

$$\text{Gamma}[x] = D_{OUT}^{MAX} \cdot (x/D_{IN}^{MAX})^\gamma \quad (11)$$

In the present embodiment, the correction point data sets CP#1 to CP#m are determined so that the gamma value γ recited in expression (11) to which a correction point data set CP#j selected from the correction point data sets CP#1 to CP#m corresponds is increased as j is increased. In other words, it holds:

$$\gamma_1 < \gamma_2 < \ldots < \gamma_{m-1} < \gamma_m, \quad (12)$$

where $\gamma_j$ is the gamma value corresponding to the correction point data set CP#j.

In one embodiment, the correction point data set $CP\_L^R$ is selected from the correction point data sets CP#1 to CP#m on the basis of the gamma value $\gamma\_PIXEL^R$. The correction point data set $CP\_L^R$ is determined as a correction point data set CP#j with a larger value of j as the gamma value $\gamma\_PIXEL^R$ increases. Correspondingly, the correction point data sets $CP\_L^G$ and $CP\_L^B$ are selected from the correction point data sets CP#1 to CP#m on the basis of the gamma values $\gamma\_PIXEL^G$ and $\gamma\_PIXEL^B$, respectively.

Figure 12:
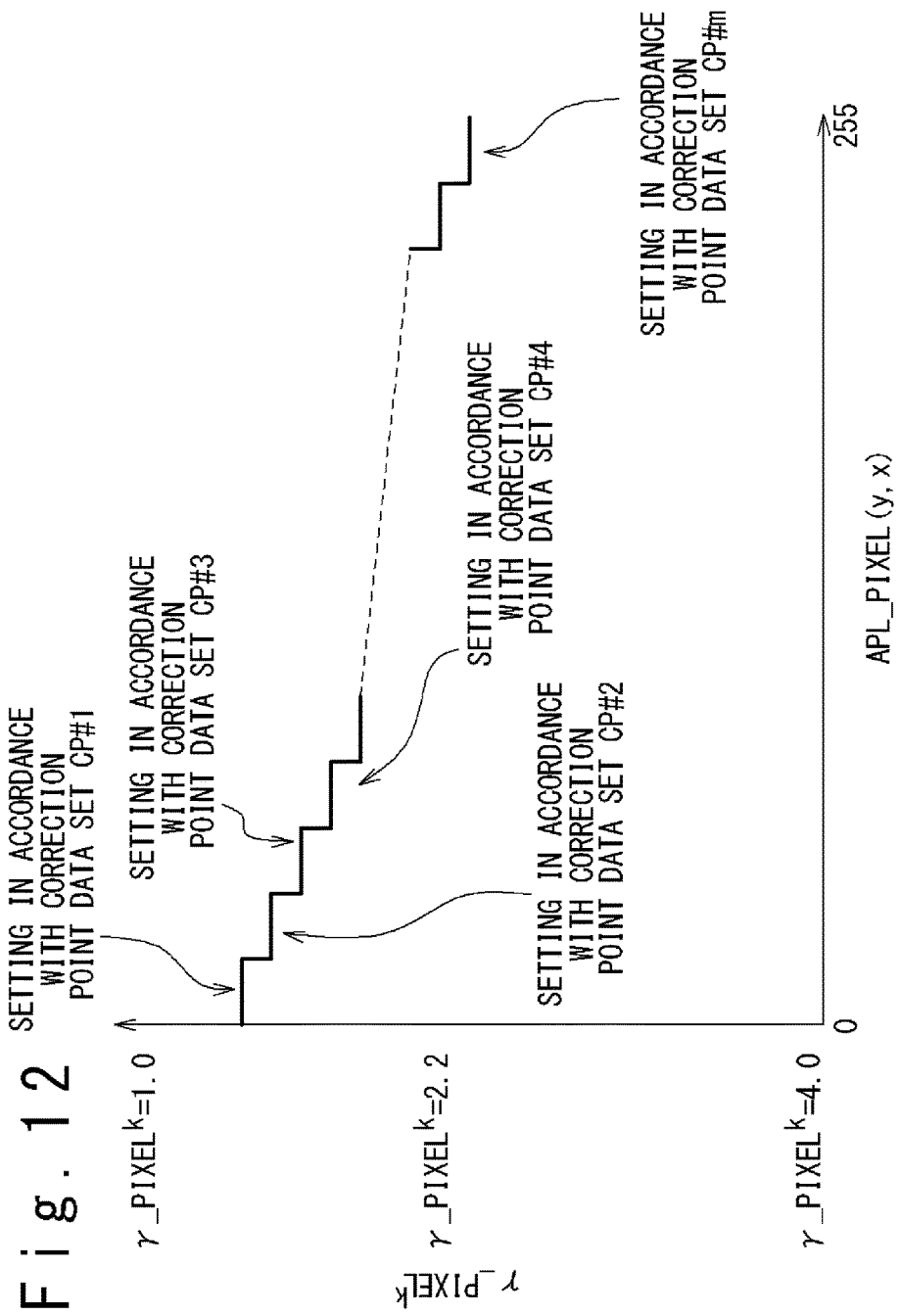
FIG. 12 is a graph illustrating the relation among APL_PIXEL(y, x), $\gamma$_PIXEL$^k$ and a correction point data set CP_L$^k$ in one embodiment.

FIG. 12 is a graph illustrating the relation among APL_PIXEL(y, x), $\gamma\_PIXEL^k$ and the correction point data set $CP\_L^k$ in the case when the correction point data set $CP\_L^k$ is determined in this manner. As the value of APL_PIXEL(y, x) increases, the gamma value $\gamma\_PIXEL^k$ is increased and a correction point data set CP#j with a larger value of j is selected as the correction point data set $CP\_L^k$.

In an alternative embodiment, the correction point data sets $CP\_L^R$, $CP\_L^G$ and $CP\_L^B$ may be determined as follows: The correction point data sets CP#1 to CP#m are stored in the correction point data calculation circuit 29 in the same way as described above. Here, the number of the correction point data sets CP#1 to CP#m stored in the correction point data calculation circuit 29 is $2^{P-(Q-1)}$, where P is the number of bits used to describe APL_PIXEL(y, x) and Q is a predetermined integer equal to more than two and less than P. This implies that $m=2^{P-(Q-1)}$. The correction point data sets CP#1 to CP#m to be stored in the correction point data calculation circuit 29 may be fed from the processor 4 to the drive IC 3 as initial settings.

Furthermore, on the basis of the gamma value $\gamma\_PIXEL^k$ (k is any one of "R", "G" and "B"), two correction point data sets CP#q and CP#(q+1) are selected from among the correction point data sets CP#1 to CP#m stored in the correction point data calculation circuit 29 for determining the correction point data set $CP\_L^k$, where q is an integer from one to m−1. The two correction point data sets CP#q and CP#(q+1) are selected to satisfy the following expression:

$$\gamma_q < \gamma\_PIXEL^k < \gamma_{q+1}.$$

The correction point data CP0 to CP5 of the correction point data set $CP\_L^k$ are respectively calculated with an interpolation of correction point data CP0 to CP5 of the selected two correction point data sets CP#q and CP#(q+1).

More specifically, the correction point data CP0 to CP5 of the correction point data set $CP\_L^k$ (where k is any of "R", "G" and "B") are calculated from the correction point data CP0 to CP5 of the selected two correction point data sets CP#q and CP#(q+1) in accordance with the following expressions:

$$CP\alpha\_L^k = CP\alpha(\#q) + \{(CP\alpha(\#(q+1)) - CP\alpha(\#q))/2^Q\} \times APL\_PIXEL[Q-1:0], \quad (13)$$

where $\alpha$ is an integer from zero to five, $CP\alpha\_L^k$ is the correction point data $CP\alpha$ of correction point data set $CP\_L^k$, $CP\alpha(\#q)$ is the correction point data $CP\alpha$ of the selected correction point data set CP#q, $CP\alpha(\#(q+1))$ is the correction point data $CP\alpha$ of the selected correction point data set CP#(q+1), and APL_PIXEL[Q−1:0] is the lowest Q bits of APL_PIXEL(y, x).

Figure 13:
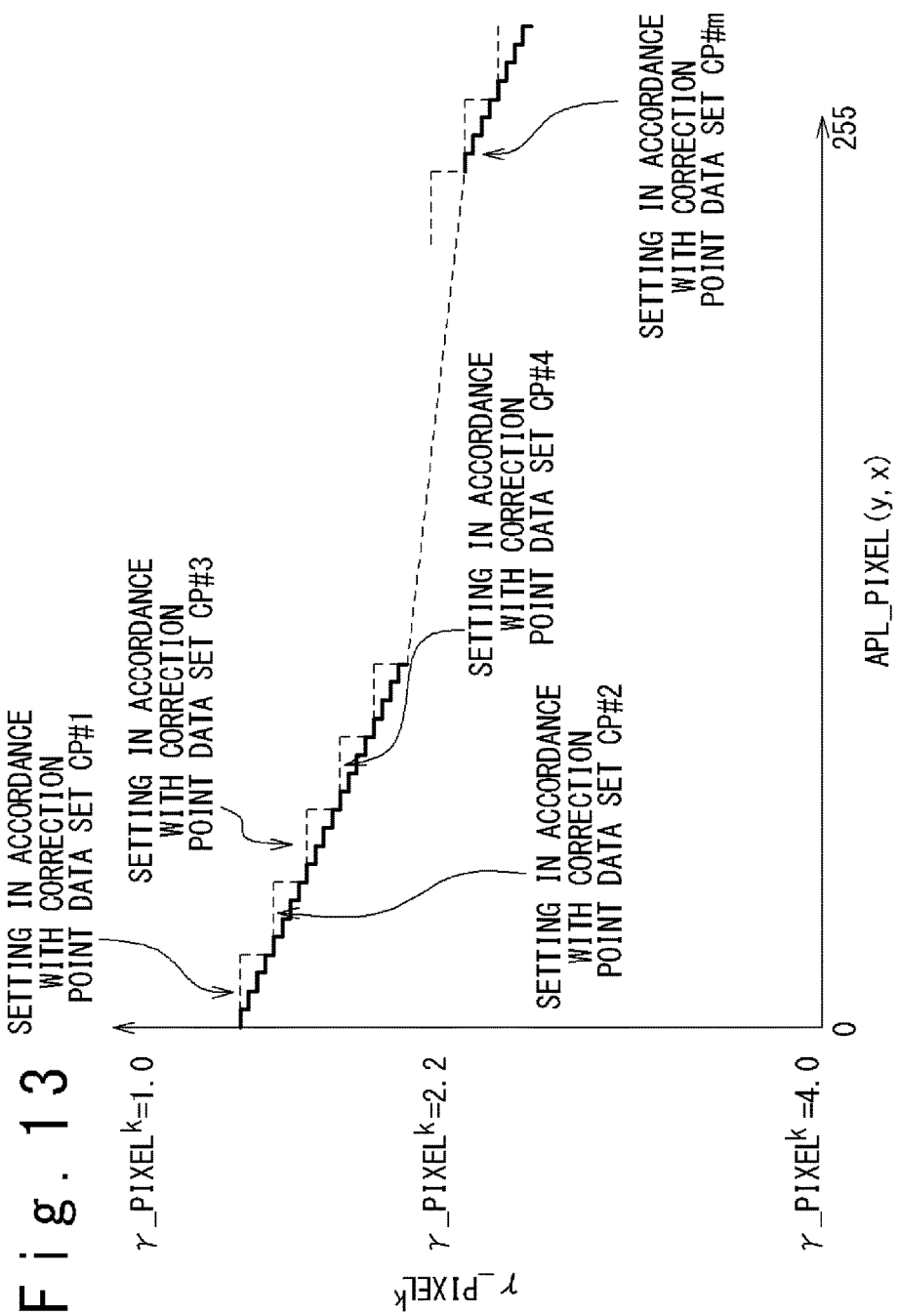
FIG. 13 is a graph illustrating the relation among APL_PIXEL(y, x), $\gamma$_PIXEL$^k$ and a correction point data set CP_L$^k$ in another embodiment.

FIG. 13 is a graph illustrating the relation among APL_PIXEL(y, x), $\gamma\_PIXEL^k$ and the correction point data set $CP\_L^k$ in the case when the correction point data set $CP\_L^k$ is determined in this manner. As the value of APL_PIXEL(y, x) increases, the gamma value $\gamma\_PIXEL^k$ is increased and correction point data sets CP#q and CP#(q+1) with a larger value of q are selected. The correction point data set $CP\_L^k$ is determined to correspond to a gamma value in a range from the gamma value $\gamma_q$ to $\gamma_{q+1}$, which the correction point data sets CP#q and CP#(q+1) correspond to, respectively.

Figure 14:
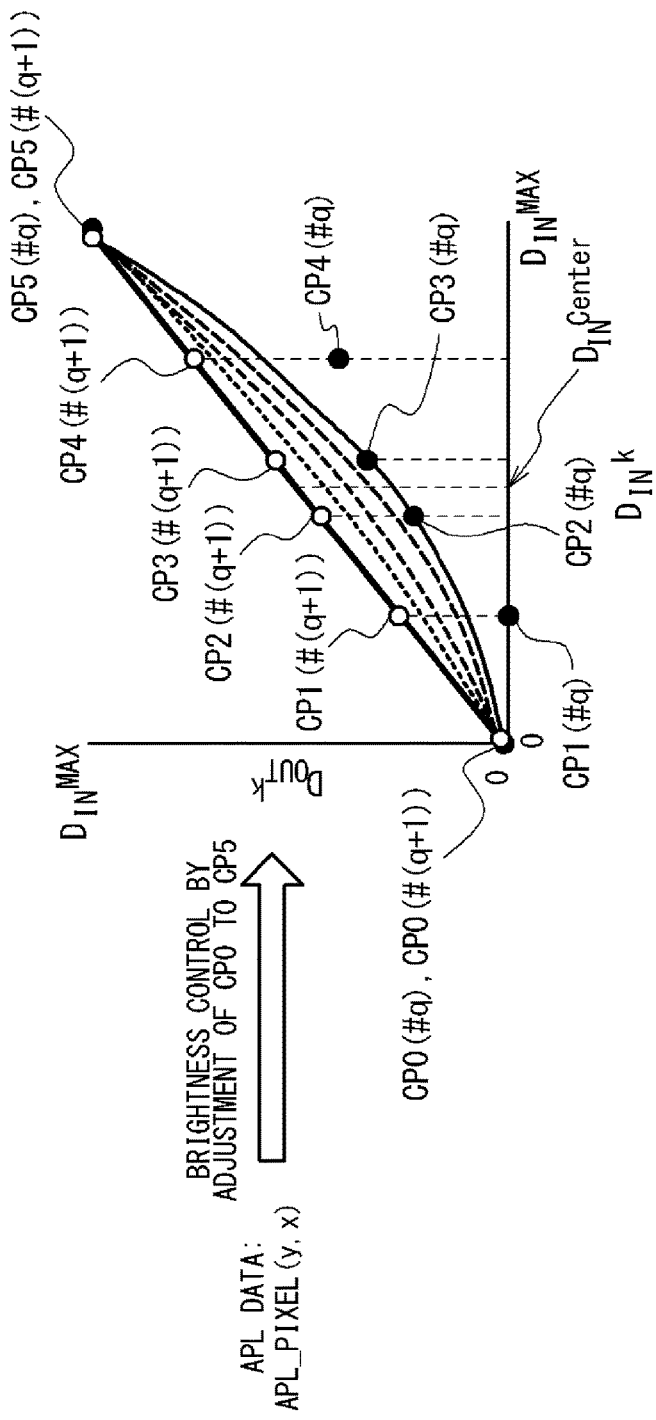
FIG. 14 is a graph illustrating the shapes of gamma curves respectively corresponding to correction data sets CP#q and CP#(q+1) and the gamma curve corresponding to the correction data set CP_L$^k$.

FIG. 14 is a graph schematically illustrating the shapes of the gamma curves corresponding to the correction point data sets CP#q and CP#(q+1) and the correction point data set $CP\_L^k$. Since the correction point data $CP\alpha$ of the correction point data set $CP\_L^k$ is obtained through the interpolation of the correction point data $CP\alpha(\#q)$ and $CP\alpha(\#(q+1))$ of the correction point data sets CP#q and CP#(q+1), the shape of the gamma curve corresponding to the correction point data set $CP\_L^k$ is determined so that the gamma curve corresponding to the correction point data set $CP\_L^k$ is located between the gamma curves corresponding to the correction point data sets CP#q and CP#(q+1). The calculation of the correction point data CP0 to CP5 of the correction point data set $CP\_L^k$ through the interpolation of the correction point data CP0 to CP5 of the correction point data sets CP#q and CP#(q+1) is advantageous for allowing finely adjusting the gamma value used for the gamma correction even when only a reduced number of the correction point data sets CP#1 to CP#m are stored in the correction point data calculation circuit 29.

Referring back to FIG. 6, the correction point data set $CP\_L^k$ thus determined (where k is any of "R", "G" and "B") are then modified on the basis of variance data $\sigma^2\_PIXEL(y, x)$ included in the pixel-specific characterization data $D_{CHR\_PIXEL}$ to thereby calculate the correction point data set $CP\_sel^k$, which is finally fed to the approximate gamma correction circuit 22 (at step S16). The correction point data set $CP\_sel^k$ is calculated for each pixel 9. It should be noted that, since the correction point data set $CP\_L^k$ is a data set which represents the shape of a specific gamma curve as described above, the modification of the correction point data set $CP\_L^k$ based on the variance data $\sigma^2\_PIXEL(y, x)$ is technically considered as equivalent to a modification of the gamma curve used for the gamma correction based on the variance data $\sigma^2\_PIXEL(y, x)$.

Figure 15:
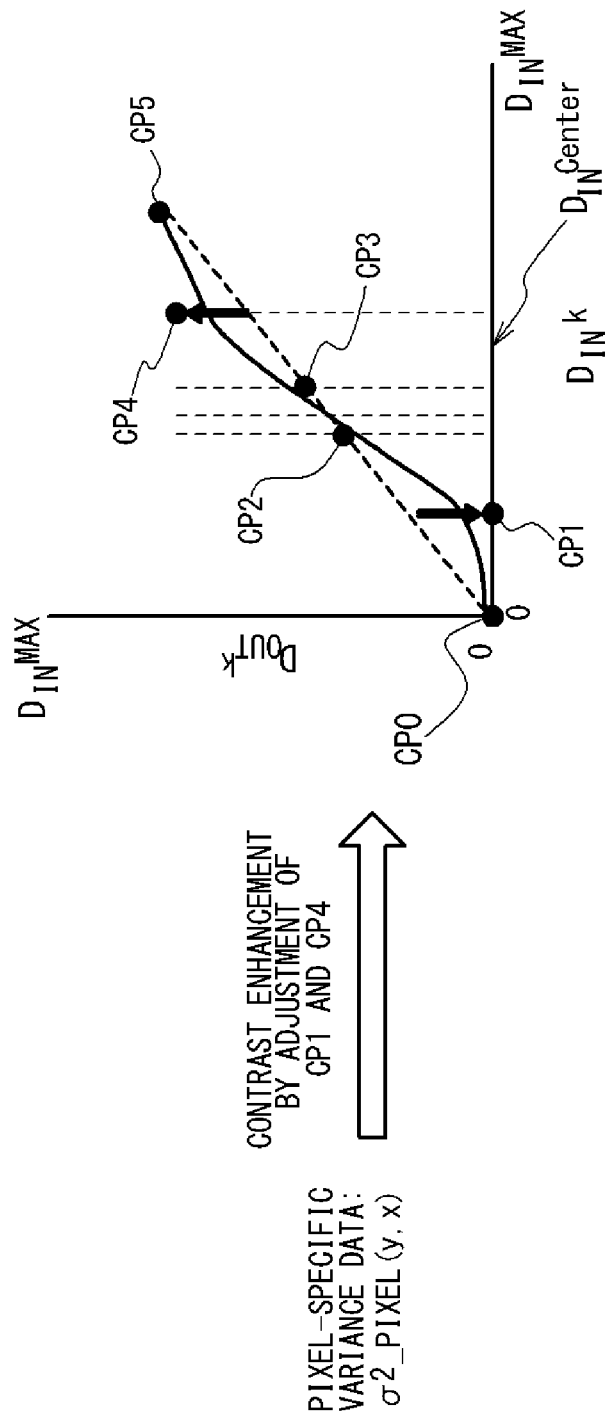
FIG. 15 is a conceptual diagram illustrating a technical significance of modification of the correction point data set CP_L$^k$ on the basis of variance data $\sigma^2$_PIXEL(y, x)

FIG. 15 is a conceptual diagram illustrating a technical meaning of the modification of the correction point data set $CP\_L^k$ based on the variance data $\sigma^2\_PIXEL(y, x)$. A reduced value of variance data $\sigma^2\_PIXEL(y, x)$ associated with a certain pixel 9 implies that an increased number of pixels 9 have luminance values close to the APL_PIXEL (y, x) around the certain pixel 9; in other words, the contrast of the image is small. When the contrast of an image corresponding to the input image data $D_{IN}$ is small, it is possible to display the image with an improved image quality by performing a correction calculation to enhance the contrast by the approximate gamma correction circuit 22.

Since the correction point data CP1 and CP4 of the correction point data set $CP\_L^k$ largely influence the contrast, the correction point data CP1 and CP4 of the correction point data set $CP\_L^k$ are adjusted on the basis of the variance data $\sigma^2\_PIXEL(y, x)$ in the present embodiment. The correction point data CP1 of the correction point data set $CP\_L^k$ is modified so that the correction point data CP1 of the correction point data set $CP\_sel^k$, which is finally fed to the approximate gamma correction circuit 22, is decreased as the value of the variance data $\sigma^2\_PIXEL(y, x)$ decreases. The correction point data CP4 of the correction point data set $CP\_L^k$ is, on the other hand, modified so that the correction point data CP4 of the correction point data set $CP\_sel^k$, which is finally fed to the approximate gamma correction circuit 22, is increased as the value of the variance data $\sigma^2\_PIXEL(y, x)$ decreases. Such modification results in that the correction calculation in the approximate gamma correction circuit 22 is performed to enhance the contrast, when the contrast of the image corresponding to the input image data $D_{IN}$ is small.

It should be noted that the correction point data CP0, CP2, CP3 and CP5 of the correction point data set $CP\_L^k$ are not modified in the present embodiment. In other words, the values of the correction point data CP0, CP2, CP3 and CP5 of the correction point data set $CP\_sel^k$ are equal to the correction point data CP0, CP2, CP3 and CP5 of the correction point data set $CP\_L^k$, respectively.

In one embodiment, the correction point data CP1 and CP4 of the correction point data set $CP\_sel^k$ are calculated in accordance with the following expressions:

$$CP1\_sel^R = CP1\_L^R - (D_{IN}^{MAX} - \sigma^2\_PIXEL(y,x)) \cdot \xi^R, \quad (14a)$$

$$CP1\_sel^G = CP1\_L^G - (D_{IN}^{MAX} - \sigma^2\_PIXEL(y,x)) \cdot \xi^G, \quad (14b)$$

$$CP1\_sel^B = CP1\_L^B - (D_{IN}^{MAX} - \sigma^2\_PIXEL(y,x)) \cdot \xi^B, \quad (14c)$$

$$CP4\_sel^R = CP4\_L^R + (D_{IN}^{MAX} - \sigma^2\_PIXEL(y,x)) \cdot \xi^R, \quad (15a)$$

$$CP4\_sel^G = CP4\_L^G + (D_{IN}^{MAX} - \sigma^2\_PIXEL(y,x)) \cdot \xi^G,$$
$$\text{and} \quad (15b)$$

$$CP4\_sel^B = CP4\_L^B + (D_{IN}^{MAX} - \sigma^2\_PIXEL(y,x)) \cdot \xi^B, \quad (15c)$$

where $D_{IN}^{MAX}$ is the allowed maximum value of the input image data $D_{IN}$, and $\xi^R$, $\xi^G$, and $\xi^B$ are given proportionality constants; the proportionality constants $\xi^R$, $\xi^G$, and $\xi^B$ may be equal to each other, or different. Note that $CP1\_sel^k$ and $CP4\_sel^k$ are correction point data CP1 and CP4 of the correction point data set $CP\_sel^k$ and $CP1\_L^k$ and $CP4\_L^k$ are correction point data CP1 and CP4 of the correction point data set $CP\_L^k$.

Figure 16:
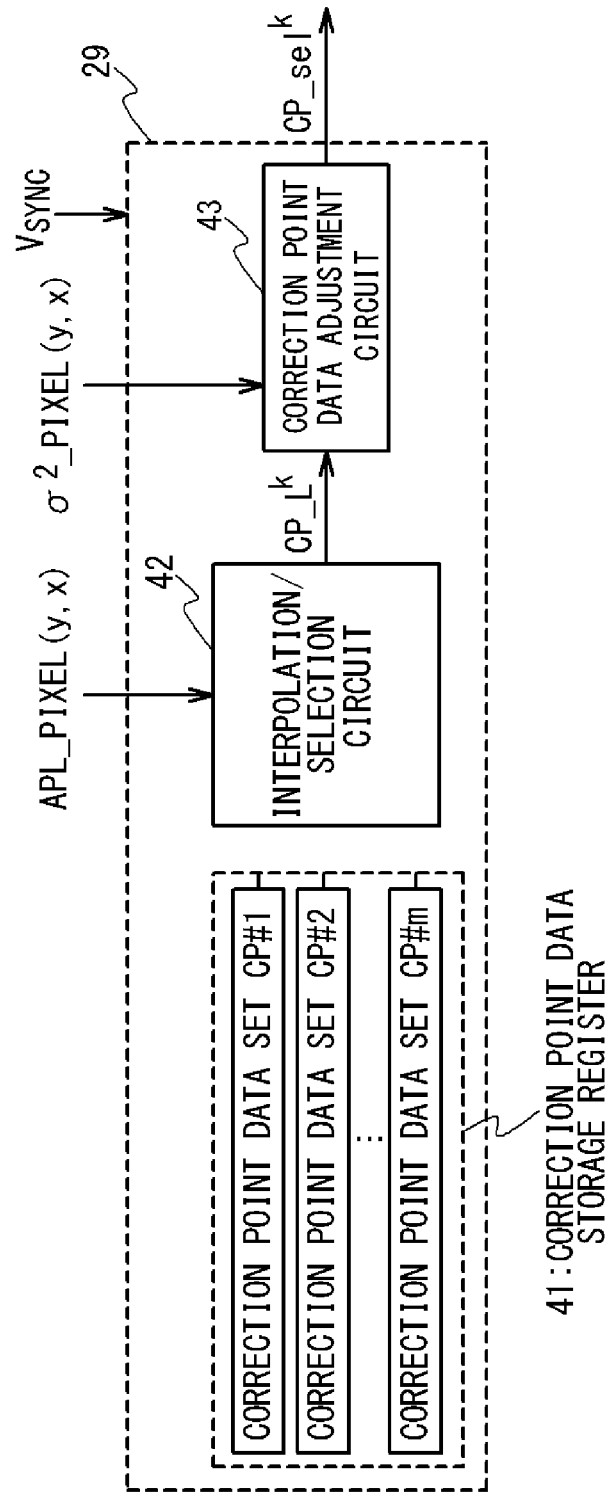
FIG. 16 is a block diagram illustrating a preferred example of the configuration of a correction point data calculation circuit in the present embodiment.

FIG. 16 is a block diagram illustrating a preferred example of the configuration of the correction point data calculation circuit 29, which performs the above-described processes at steps S14 to S16. In the example illustrated in FIG. 16, the correction point data calculation circuit 29 includes: a correction point data storage register 41, an interpolation/selection circuit 42 and a correction point data adjustment circuit 43.

The correction point data storage register 41 stores therein the above-described correction point data sets CP#1 to CP#m. As described above, the correction point data sets CP#1 to CP#m are used as seed data for determining the correction point data sets $CP\_L^R$, $CP\_L^G$ and $CP\_L^B$.

The interpolation/selection circuit 42 determines the correction point data sets $CP\_L^R$, $CP\_L^G$ and $CP\_L^B$ on the basis of the APL data APL_PIXEL(y, x) included in the pixel-specific characterization data $D_{CHR\_PIXEL}$. In one embodiment, as described above, the gamma value $\gamma\_PIXEL^k$ (k is any of "R", "G" and "B") is calculated from the APL data APL_PIXEL(y, x) in accordance with the expressions (8a) to (8c) and the correction point data set $CP\_L^k$ is selected from the correction point data sets CP#1 to CP#m on the basis of the gamma value $\gamma\_PIXEL^k$. In an alternative embodiment, two of the correction point data sets CP#1 to CP#m are selected on the basis of the gamma value $\gamma\_PIXEL^k$ and the correction point data set $CP\_L^k$ is each calculated by applying an interpolation (more specifically, the calculation according to expression (13)) to the selected two correction point data sets, depending on the APL data APL_PIXEL(y, x). The correction point data sets $CP\_L^B$, $CP\_L^G$ and $CP\_L^B$, which are determined by the interpolation/selection circuit 42, are forwarded to the correction point data adjustment circuit 43.

The correction point data adjustment circuit 43 modifies the correction point data sets $CP\_L^B$, $CP\_L^G$ and $CP\_L^B$ on the basis of the variance data $\sigma^2\_PIXEL(y, x)$ included in the pixel-specific characterization data $D_{CHR\_PIXEL}$, to thereby calculate the correction point data sets $CP\_sel^R$, $CP\_sel^G$ and $CP\_sel^B$, which are finally fed to the approximate gamma correction circuit 22. The modification of the correction point data sets $CP\_L^B$, $CP\_L^G$ and $CP\_L^B$ may be achieved in accordance with expressions (14a) to (14c) and (15a) to (15c), for example.

Referring back to FIG. 6, the approximate gamma correction units 22R, 22G and 22B of the approximate gamma correction circuit 22 respectively perform correction calculations on input image data $D_{IN}^R$, $D_{IN}^G$ and $D_{IN}^B$ associated with each pixel 9 on the basis of the correction point data sets $CP\_sel^R$, $CP\_sel^G$ and $CP\_sel^B$, respectively, which are calculated by the correction point data calculation section 29, to thereby generate the output image data $D_{OUT}^R$, $D_{OUT}^G$ and $D_{OUT}^B$ (at step S17).

Each approximate gamma correction unit 22k (k is any of "R", "G" and "B") calculates the output image data $D_{OUT}^k$ from the input image data $D_{IN}^k$ in accordance with the following expressions:

(1) For the case when $D_{IN}^k < D_{IN}^{Center}$ and $CP1 > CP0$ $$D_{OUT}^k = \frac{2(CP1 - CP0) \cdot PD_{INS}}{K^2} + \frac{(CP3 - CP0)D_{INS}}{K} + CP0 \quad (16a)$$

It should be noted that the fact that the value of the correction point data CP0 is larger than that of the correction point data CP1 implies that the gamma value $\gamma$ used for the gamma correction is smaller than one.

(2) For the case when $D_{IN}^k < D_{IN}^{Center}$ and $CP1 \leq CP0$ $$D_{OUT}^k = \frac{2(CP1 - CP0) \cdot ND_{INS}}{K^2} + \frac{(CP3 - CP0)D_{INS}}{K} + CP0 \quad (16b)$$

It should be noted that the fact that the value of the correction point data CP0 is equal to or less than that of the correction point data CP1 implies that the gamma value $\gamma$ used for the gamma correction is equal to or larger than one.

(3) For the case when $D_{IN}^k > D_{IN}^{Center}$ $$D_{OUT}^k = \frac{2(CP4 - CP2) \cdot ND_{INS}}{K^2} + \frac{(CP5 - CP2)D_{INS}}{K} + CP2 \quad (16c)$$

In the above, the center data value $D_{IN}^{Center}$ is a value defined by the following expression:

$$D_{IN}^{Center} = D_{IN}^{MAX}/2, \quad (17)$$

where $D_{IN}^{MAX}$ is the allowed maximum value and K is the parameter given by the above-described expression (10). Furthermore, $D_{INS}$, $PD_{INS}$, and $ND_{INS}$ recited in expressions (16a) to (16c) are values defined as follows:

(a) $D_{INS}$ $D_{INS}$ is a value which depends on the input image data $D_{IN}^k$; $D_{INS}$ is given by the following expressions (18a) and (18b):

$$D_{INS} = D_{IN}^k \quad (\text{for } D_{IN}^k < D_{IN}^{Center}) \quad (18a)$$

$$D_{INS} = D_{IN}^k + 1 - K \quad (\text{for } D_{IN}^k > D_{IN}^{Center}) \quad (18b)$$

(b) $PD_{INS}$ $PD_{INS}$ is defined by the following expression (19a) with a parameter R defined by expression (19b):

$$PD_{INS} = (K - R) \cdot R \quad (19a)$$

$$R = K^{1/2} \cdot D_{INS}^{1/2} \quad (19b)$$

As understood from expressions (18a), (18b) and (19b), the parameter R is proportional to a square root of input image data $D_{IN}{}^k$ and therefore $PD_{INS}$ is a value calculated by an expression including a term proportional to a square root of $D_{IN}{}^k$ and a term proportional to $D_{IN}{}^k$ (or one power of $D_{IN}{}^k$).

(c) $ND_{INS}$ $ND_{INS}$ is given by the following expression (20):

$$ND_{INS}=(K-D_{INS}) \cdot D_{INS} \qquad (20)$$

As understood from expressions (18a), (18b) and (20), $ND_{INS}$ is a value calculated by an expression including a term proportional to a square of $D_{IN}{}^k$.

The output image data $D_{OUT}{}^R$, $D_{OUT}{}^G$ and $D_{OUT}{}^B$, which are calculated by the approximate gamma correction circuit 22 with the above-described series of expressions, are forwarded to the color reduction circuit 23. In the color reduction circuit 23, a color reduction is performed on the output image data $D_{OUT}{}^R$, $D_{OUT}{}^G$ and $D_{OUT}{}^B$ to generate the color-reduced image data $D_{OUT\_D}$. The color-reduced image data $D_{OUT\_D}$ are forwarded to the data line drive circuit 26 via the latch circuit 24 and the data lines 8 of the LCD panel 2 are driven in response to the color-reduced image data $D_{OUT\_D}$.

As described above, in the present embodiment, area characterizations data $D_{CHR\_AREA}$ are calculated for each of a plurality of areas defined by dividing the display region 5 of the LCD panel 5, and a correction calculation (contrast enhancement) is performed on input image data $D_{IN}$ associated with pixels 9 in each area, depending on the area characterizations data $D_{CHR\_AREA}$ associated with each area. Such operation provides a correction suitable for each area. When the display region 5 includes an area in which a dark image is displayed and an area in which a bright image is displayed, for example, the operation of the present embodiment allows image correction suitable for each area. This effectively improves the image quality.

In the meantime, in the present embodiment, pixel-specific characterization data $D_{CHR\_PIXEL}$ are calculated for each pixel 9 by applying filtering to the area characterization data $D_{CHR\_AERA}$, and the input image data $D_{IN}$ associated with each pixel 9 are corrected depending on the pixel-specific characterization data $D_{CHR\_PIXEL}$ associated with each pixel 9. In detail, pixel-specific characterization data $D_{CHR\_PIXEL}$ associated with a certain pixel 9 is calculated by applying filtering to area characterization data $D_{CHR\_AREA}$ associated with the area in which the certain pixel 9 is located and with the areas around (or adjacent to) the area in which the certain pixel 9 is located. This approach effectively reduces block noise at the boundaries between areas.

It should be noted that, although the above-described embodiments recite that the area characterization data $D_{CHR\_AREA}$, filtered characterization data $D_{CHR\_FILTER}$ and pixel-specific characterization data $D_{CHR\_PIXEL}$ include APL data and variance data, the contents of the area characterization data $D_{CHR\_AREA}$, filtered characterization data $D_{CHR\_FILTER}$ and pixel-specific characterization data $D_{CHR\_PIXEL}$ are not limited to the combination of APL data and variance data; the area characterization data $D_{CHR\_AREA}$, filtered characterization data $D_{CHR\_FILTER}$ and pixel-specific characterization data $D_{CHR\_PIXEL}$ may include data indicating one or more feature quantities other than APL data and variance data.

In an alternative embodiment, the area characterization data $D_{CHR\_AREA}$, filtered characterization data $D_{CHR\_FILTER}$ and pixel-specific characterization data $D_{CHR\_PIXEL}$ may include only APL data. In this case, the modification of correction point data set $CP\_L^k$ based on variance data of pixel-specific characterization data $D_{CHR\_PIXEL}$ is not performed and the correction point data set $CP\_L^k$ are used as the correction point data set $CP\_sel^k$, which are finally fed to the approximate gamma correction circuit 22, without modification. This configuration still allows selecting a gamma value suitable for each area and performing a correction calculation (gamma correction) with the selected suitable gamma value.

Although the above-described embodiments recite that gamma values $\gamma\_PIXEL^R$, $\gamma\_PIXEL^G$ and $\gamma\_PIXEL^B$ are individually calculated for the R subpixel 11R, G subpixel 11G and B subpixel 11B of each pixel 9 and the correction calculation is performed depending on the calculated gamma values $\gamma\_PIXEL^R$, $\gamma\_PIXEL^G$ and $\gamma\_PIXEL^B$, a common gamma value $\gamma\_PIXEL$ may be calculated for the R subpixel 11R, G subpixel 11G and B subpixel 11B of each pixel 9 to perform the same correction calculation.

In this case, for each pixel 9, a gamma value $\gamma\_PIXEL$ common to the R subpixel 11R, G subpixel 11G and B subpixel 11B is calculated from the APL data APL_PIXEL (y, x) associated with each pixel 9 in accordance with the following expression:

$$\gamma\_PIXEL = \gamma\_STD + APL\_PIXEL(y,x) \cdot \eta, \qquad (8a')$$

where $\gamma\_STD$ is a given reference gamma value and $\eta$ is a given positive proportionality constant.

Furthermore, a common correction point data set CP_L is determined from the gamma value $\gamma\_PIXEL$. The determination of the correction point data set CP_L from the gamma value $\gamma\_PIXEL$ is achieved in the same way as the above-described determination of the correction point data set $CP\_L^k$ (k is any of "R", "G" and "B") from the gamma value $\gamma\_PIXEL^k$. Furthermore, the correction point data set CP_L is modified on the basis of the variance data $\sigma^2\_PIXEL(y, x)$ associated with each pixel 9 to calculate a common correction point data set CP_sel. The correction point data set CP_sel is calculated in the same way as the correction point data set $CP\_sel^k$ (k is any of "R", "G" and "B"), which is calculated by modifying the correction point data set $CP\_L^k$ on the basis of the variance data $\sigma^2\_PIXEL(y, x)$ associated with each pixel 9. For the input image data $D_{IN}$ associated with any of the R subpixel 11R, G subpixel 11G and B subpixel 11B of each pixel 9, the output image data $D_{OUT}$ are calculated by performing a correction calculation based on the common correction point data set CP_sel.

Is should be also noted that, although the above-described embodiments recite the liquid crystal display device 1 including the LCD panel 2, the present invention is applicable to various panel display devices including different display panels (for example, a display device including an OLED (organic light emitting diode) display panel).

It would be apparent that the present invention is not limited to the above-described embodiments, which may be modified and changed without departing from the scope of the invention.

What is claimed is:

1. A display device, comprising:
   a display panel including a display region; and
   a driver driving each pixel of the display region in response to input image data, wherein the driver is configured:
      to calculate area characterization data indicating at least one feature value of an image displayed in each of a plurality of areas defined in the display region for each of the areas, based on the input image data, wherein the area characterization data includes:

first average picture level (APL) data indicating an average picture level of an image displayed in each of the areas defined in the display region; and first variance data indicating a variance of luminance values of pixels located in each of the areas defined in the display region;

to generate pixel-specific characterization data associated with each pixel by applying filtering to the area characterization data associated with the area in which each pixel is located and the area characterization data associated with areas adjacent to the area in which each pixel is located, wherein the pixel-specific characterization data associated with each pixel includes:

second APL data obtained by applying filtering to the first APL data of the area characterization data associated with the area in which each pixel is located and the first APL data of the area characterization data associated with the areas adjacent to the area in which each pixel is located; and second variance data obtained by applying filtering to the first variance data of the area characterization data associated with the area in which each pixel is located and the first variance data of the area characterization data associated with the areas adjacent to the area in which each pixel is located;

to generate output image data associated with each pixel by performing a correction on the input image data associated with each pixel in response to the pixel-specific characterization data associated with each pixel; and to drive each pixel in response to the output image data associated with each pixel.

2. The display device according to claim 1, wherein:
the areas defined in the display region are rectangular, and
the driver is further configured to calculate filtered characterization data associated with each vertex of each of the areas defined in the display region, based on the area characterization data associated with one or more areas which each vertex belongs to.

3. The display device according to claim 2, wherein the driver is further configured to calculate the pixel-specific characterization data associated with each pixel, based on a position of each pixel in the area in which each pixel is located and the filtered characterization data associated with vertices which belong to the area in which each pixel is located.

4. The display device according to claim 3, wherein:
the driver is configured to calculate the pixel-specific characterization data associated with each pixel by applying a linear interpolation to the filtered characterization data associated with vertices which belong to the area in which each pixel is located, depending on the position of each pixel in the area in which each pixel is located.

5. The display device according to claim 1, wherein the area characterization data include:
average picture level (APL) data indicating an average picture level of an image displayed in each of the areas defined in the display region; and
variance data indicating a variance of luminance values of pixels located in each of the areas defined in the display region.

6. The display device according to claim 1, wherein:
the driver is further configured to select a gamma value of a gamma curve for each pixel based on the second APL data of the pixel-specific characterization data associated with each pixel, and to determine a modified gamma curve by modifying the gamma curve in response to the second variance data of the pixel-specific characterization data associated with each pixel.

7. The display device according to claim 6, wherein:
the driver is further configured to generate the output image data associated with each pixel by performing the correction on the input image data associated with each pixel in accordance with the modified gamma curve.

8. A display panel driver for driving each pixel in a display region of a display panel in response to input image data, the driver comprising:

an area characterization data calculation section configured to calculate area characterization data indicating at least one feature value of an image displayed in each of areas defined in the display region for each of the areas, based on the input image data, wherein the area characterization data includes:

first average picture level (APL) data indicating an average picture level of an image displayed in each of the areas defined in the display region; and first variance data indicating a variance of luminance values of pixels located in each of the areas defined in the display region;

a pixel-specific characterization data calculation section configured to generate pixel-specific characterization data associated with each pixel by applying filtering to the area characterization data associated with areas in which each pixel is located and the area characterization data associated with areas adjacent to the areas in which each pixel is located, wherein the pixel-specific characterization data associated with each pixel includes:

second APL data obtained by applying filtering to the first APL data of the area characterization data associated with the area in which each pixel is located and the first APL data of the area characterization data associated with the areas adjacent to the area in which each pixel is located; and second variance data obtained by applying filtering to the first variance data of the area characterization data associated with the area in which each pixel is located and the first variance data of the area characterization data associated with the areas adjacent to the area in which each pixel is located;

a correction circuitry configured to generate output image data associated with each pixel by performing a correction on the input image data associated with each pixel in response to the pixel-specific characterization data associated with each pixel; and a drive circuitry configured to drive each pixel in response to the output image data associated with each pixel.

9. The display panel driver according to claim 8, wherein:
the areas defined in the display region are rectangular, and
the pixel-specific characterization data calculation section is further configured to calculate filtered characterization data associated with each vertex of each of the areas defined in the display region, based on the area characterization data associated with one or more areas which each vertex belongs to.

10. The display panel driver according to claim 9, wherein the pixel-specific characterization data calculation section is further configured to:

calculate the pixel-specific characterization data associated with each pixel, based on a position of each pixel in the area in which each pixel is located and the filtered characterization data associated with vertices which belong to the area in which each pixel is located.

11. The display panel driver according to claim 10, wherein:
the pixel-specific characterization data calculation section is configured to calculate the pixel-specific characterization data associated with each pixel by applying a linear interpolation to the filtered characterization data associated with vertices which belong to the area in which each pixel is located, depending on the position of each pixel in the area in which each pixel is located.

12. The display panel driver according to claim 8, wherein the area characterization data include:
average picture level (APL) data indicating an average picture level of an image displayed in each of the areas defined in the display region; and
variance data indicating a variance of luminance values of pixels located in each of the areas defined in the display region.

13. The display panel driver according to claim 8, wherein:
the correction circuitry is further configured to select a gamma value of a gamma curve for each pixel based on the second APL data of the pixel-specific characterization data associated with each pixel, and to determine a modified gamma curve by modifying the gamma curve in response to the second variance data of the pixel-specific characterization data associated with each pixel.

14. The display panel driver according to claim 13, wherein the correction circuitry is further configured to:
generate the output image data associated with each pixel by performing the correction on the input image data associated with each pixel in accordance with the modified gamma curve.

15. A driving method of driving a display panel including a display region, the method comprising:
calculating area characterization data indicating at least one feature value of an image displayed in each of a plurality of areas defined in the display region for each of the areas, based on the input image data, wherein the area characterization data includes:
first average picture level (APL) data indicating an average picture level of an image displayed in each of the areas defined in the display region; and
first variance data indicating a variance of luminance values of pixels located in each of the areas defined in the display region;
generating pixel-specific characterization data associated with each pixel of the display region by applying filtering to the area characterization data associated with areas in which each pixel is located and the area characterization data associated with areas adjacent to the areas in which each pixel is located, wherein the pixel-specific characterization data associated with each pixel includes:
second APL data obtained by applying filtering to the first APL data of the area characterization data associated with the area in which each pixel is located and the first APL data of the area characterization data associated with the areas adjacent to the area in which each pixel is located; and
second variance data obtained by applying filtering to the first variance data of the area characterization data associated with the area in which each pixel is located and the first variance data of the area characterization data associated with the areas adjacent to the area in which each pixel is located;
generating output image data associated with each pixel by performing a correction on the input image data associated with each pixel in response to the pixel-specific characterization data associated with each pixel; and
driving each pixel in response to the output image data associated with each pixel.

16. The driving method according to claim 15, wherein:
the areas defined in the display region are rectangular, and
the method further comprises calculating filtered characterization data associated with each vertex of each of the areas defined in the display region, based on the area characterization data associated with one or more areas which each vertex belongs to.

* * * * *